(12) United States Patent
Cullen

(10) Patent No.: US 11,176,781 B2
(45) Date of Patent: Nov. 16, 2021

(54) BET CONTRACT EXCHANGE

(71) Applicant: The Bet Exchange LLC, Mount Prospect, IL (US)

(72) Inventor: Robert J. Cullen, Mount Prospect, IL (US)

(73) Assignee: THE BET EXCHANGE LLC, Mount Prospect, IL (US)

( * ) Notice: Subject to any disclaimer, the term of this patent is extended or adjusted under 35 U.S.C. 154(b) by 0 days.

(21) Appl. No.: 16/803,694

(22) Filed: Feb. 27, 2020

(65) Prior Publication Data

US 2021/0272421 A1    Sep. 2, 2021

(51) Int. Cl.
  *G07F 17/32* (2006.01)
  *G06Q 40/04* (2012.01)

(52) U.S. Cl.
  CPC ......... *G07F 17/3288* (2013.01); *G06Q 40/04* (2013.01)

(58) Field of Classification Search
  CPC ............. G07F 17/3288; G07F 17/3244; G07F 17/3279
  See application file for complete search history.

(56) References Cited

U.S. PATENT DOCUMENTS

| | | | |
|---|---|---|---|
| 8,682,773 B1* | 3/2014 | Murphy | G06Q 40/00 705/36 R |
| 9,855,503 B2 | 1/2018 | Rishi | |
| 9,911,270 B2 | 3/2018 | LaRocca et al. | |
| 9,984,535 B2 | 5/2018 | Odom | |
| 10,159,893 B2 | 12/2018 | Steven | |
| 10,343,074 B2 | 7/2019 | Thormann | |
| 10,416,840 B2 | 9/2019 | Rolih | |
| 10,417,872 B2 | 9/2019 | Heathcote et al. | |
| 2012/0115554 A1 | 5/2012 | Cairns et al. | |
| 2012/0209756 A1* | 8/2012 | El-Sakkout | G06Q 40/04 705/37 |
| 2013/0066801 A1* | 3/2013 | Phillips | G06Q 40/00 705/36 R |
| 2016/0358234 A1 | 12/2016 | LaRocca et al. | |
| 2016/0358238 A1 | 12/2016 | LaRocca et al. | |
| 2016/0358248 A1 | 12/2016 | LaRocca et al. | |

* cited by examiner

*Primary Examiner* — Omkar A Deodhar
*Assistant Examiner* — Eric M Thomas
(74) *Attorney, Agent, or Firm* — Klintworth & Rozenblat IP LLP

(57) ABSTRACT

Systems and computer-implemented methods for a bet exchange. The bet exchange receives bet orders from users and matches bet-for orders with bet-against orders to generate instances of standardized bet contracts. The bet-for orders are bets on a bet event occurring, and bet-against orders are bets on a bet event not occurring. The bet events have a standardized payout amount, which is used to determine a value to transfer to the trader that made the bet-for order when the bet event occurs, or to the trader that made the bet-against order when the bet event does not occur.

20 Claims, 16 Drawing Sheets

BET CONTRACT EXCHANGE

BACKGROUND

The Supreme Court recently struck down the federal statute that made sports betting against the law. Since then, most states have either legalized sports betting or have legislation pending to do so. Currently, sports betting is being implemented via bookmakers, either directly or online. The esports industry, particularly fantasy sports sites, has become increasingly popular benefiting from the legalization of sports betting. Many states had deemed fantasy sports sites a form of gambling and began to stop the use of fantasy sports sites within the states. With sports gambling now being legal in many states, fantasy sports sites such as FanDuel™ and DraftKings™ have drawn millions of users in providing a platform on which to engage in fantasy sports contests based on real-life sporting events.

Bookmakers have been operating since long before the advent of the Internet. Bookmakers, or "bookies," would accept wagers either in person or by phone. Bets can be based on a point spread or on odds placed on sporting events between two teams, for example. Bookmakers now operate substantially on the Internet. In many countries, such online betting sites have been legally operating for many years. The online sports betting industry is expected to grow substantially in the United States.

One problem with betting through bookmakers is the middleman, or the bookmaker himself. The bets become contests between the bettor and the outcome. It would be more interesting for players to bet against others. In addition, the vast majority of the betting involves winners and losers, such as football teams or boxers. Other types of bets, such as bets on performance events or measures, would make things more interesting for the players.

Sports betting has been made available on-line over the Internet. Some sites permit users to place bets on events relating to sports, primarily on the outcome of the events. Such sites typically do little more than operate as an electronic bookmaking service. Users may rely on bookmaker odds and other typical betting information to guide them. Bettors may also obtain additional information about the events in a more efficient manner than through the press by researching aspects of the events online. Bettors still lack, however, information about the market value of their bets, changes in the level of risk they've taken in their bets, and information regarding changes in how other bettors view any changing circumstances in the bet event.

The sites also do not provide substantial opportunities to change or affect one's position in their bets, or one's chances of winning, at least after the sporting event has started. Bets placed with bookmakers may offer only limited ways to change one's positions. Even if a bettor can change his or her bet, no information or indication of its significance is registered, or reported. No knowledge is gleaned from such actions nor made available to other bettors.

Other sites offer what has become known as fantasy sports competitions. Fantasy sports sites operate by allowing a user to select a sport to view a list of upcoming competitions based on scheduled, real-life events in the selected sport. Each competition, or contest, has an entry fee and a payout structure for the traders based on the number of points accumulated by the traders during the real-life events. The trader selects a competition and is provided with a budget for selection of players to add to the player's roster. The trader selects players having different made-up "salaries," which are deducted from the user's budget as the players are selected. The "salaries" are based on past performances of the players, particularly in the measures that allow for the users to win points based on the player's performance. When the trader has filled his roster, the user enters the competition. Up until the beginning of the scheduled real-life event, the trader may make changes to his roster based on updates on the fitness of the players or other factors that become relevant before the beginning of the competition.

Once the real-life events begin, the trader's score is tallied as the players in their rosters perform in a way that wins the users points. The trader's options for improving their scores are limited to selecting players for their rosters, which a trader cannot do when the real-life event has started. At the conclusion of the real-life event, the traders' scores are tallied and listed in order from highest to lowest point totals. The competition is then settled by applying the payout structure of the competition.

One problem with the current fantasy e-sport systems is that a trader's success is based largely on luck. While selection of players involves the user's knowledge of and research on the players and team performances, the traders lack tools to enhance their chances based on skill, or even on their knowledge and research after the event begins. Moreover, once the sporting event starts, the user is unable to affect his chances of winning. In addition, the method of scoring and game structure provides for liquidity in the games. Players are given salaries based on their performance up until the game begins. It remains that way despite injuries that may affect the player's performance or even ability to perform.

SUMMARY

In view of the above, systems and non-transitory, computer-implemented methods are provided for a bet exchange system operating on a server or other network service hardware platform and having a system database. In an example bet exchange system, a data network connection enables the system to communicate over a data network with a plurality of client devices. The system database stores bet records and executable programs configured to receive and send communications over the data network, and to perform program functions of the bet exchange system. A plurality of bet orders is received electronically over the data network. The bet orders comprise digital data records containing data representing buy orders and sell orders for bet-for positions on a bet event occurring and bet-against positions to bet on the bet event not occurring. Each bet order includes a limit amount. A processor executes the executable instructions for program modules of a bet exchange application. The program modules include, for example, a bet exchange core module configured to match buy-to-open (BTO) orders with sell-to-open (STO) orders and to generate instances of two-party standardized bet contracts. Each instance of standardized bet contracts creates a bet-for position for a first trader and a bet-against position for a second trader. The standardized bet contracts include a standardized payout amount and a bet event identifier. The standardized bet contract generator compares the limit amount of the bet orders to determine a trade amount for a match that does not exceed the limit amounts of the bet orders. A fulfillment module manages a transfer of an amount based on a final trade value of the instances of the standardized bet contract and the standardized payout amount to the traders holding bet-for positions when the bet event has occurred or to the traders holding bet-against positions when the bet event has not occurred.

In one aspect, the bet exchange system may receive different types of orders to open or close bet positions on the bet events. A trader may send buy orders or sell orders to bet-for or bet-against a bet event happening. Four types of orders are received by an example implementation. A trader may open a bet-for position by sending the system a buy-to-open (BTO) order. A trader may open a bet-against position by sending the system a sell-to-open (STO) order. Once traders have bet positions, the traders may send orders to close bet positions. For example, a trader may close or edit a bet-for position by sending a sell-to-close order (STC). A trader may close or edit a bet-against position by sending a buy-to-close (BTC) order.

In another aspect, a non-transitory, computer-implemented method operating on a server and having a system database is provided. An example method comprises receiving a plurality of bet orders over a data network from a plurality of client devices associated with a plurality of traders. The bet orders include digital data representing buy orders and sell orders for bet-for positions on a bet event occurring and bet-against positions to bet on the bet event not occurring. Each bet order includes a limit amount and an order type, which includes order types of bet-to-open ("BTO") order for bet-for open orders or a sell-to-open ("STO") order for bet-against open orders. The limit amount of the BTO orders are compared with the limit amount of the STO orders to determine a trade amount for a match between BTO and STO orders. The trade amount is based on the limit amount of the BTO order or the STO order.

An instance of a standardized bet contract is formed between one of the BTO orders and one of the STO orders when the trade amount of a match between the one of the BTO orders and the one of the STO orders is less than or equal to a value based on the limit amounts of the BTO order and the STO order. The BTO order and the STO order become a bet-for position and bet-against position, respectively, in the instance of the standardized bet contracts. The bet positions belong to the traders that sent the bet orders. The instances of the standardized bet contracts settle by transferring an amount based on a final trade value of the instances of standardized bet contracts and the standardized payout amount to the traders holding bet-for positions when the bet event has occurred or to the traders holding bet-against positions when the bet event has not occurred.

DETAILED DESCRIPTION

Figure 1:
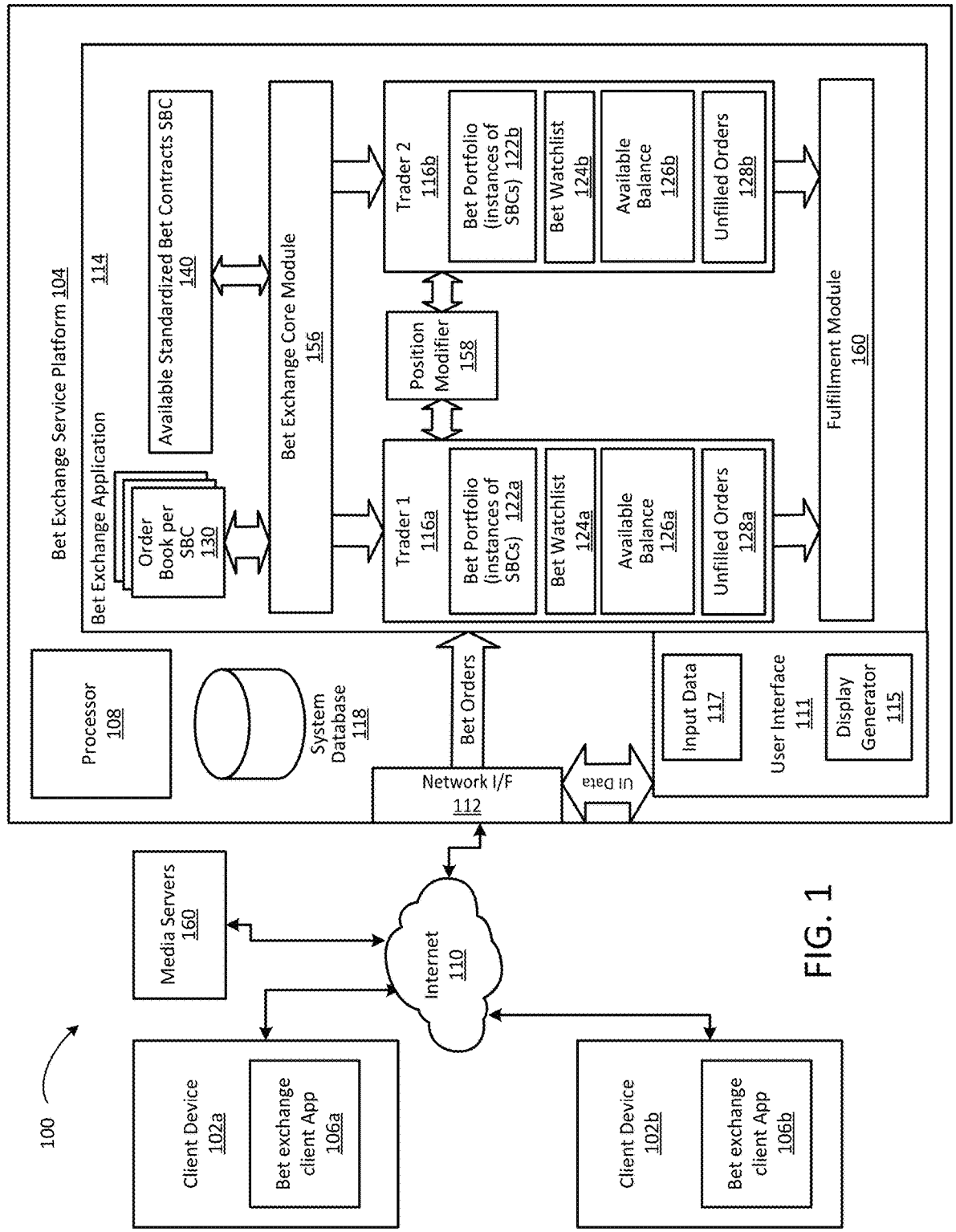
FIG. 1 is a block diagram of an example implementation of a system for a bet exchange system.

Disclosed below are systems and methods for implementing a virtual, two-party standardized bet contract exchange platform operating on a computing system (e.g. server, a cloud computing environment, etc.). The platform provides users communicating with the system over the Internet with an exchange for bets and a new way to place bets. Two-party standardized bet contracts are created on the bet exchange system in which the standardized bet contracts may float in value based on the values entered by the traders. The standardized bet contracts correspond to bet events, or milestones that may or may not happen. The traders use an order entry system to bid, initially, on "for" or "against" positions on the bet events identified in the standardized bet contracts. Bet-for positions are bets on the bet event happening. Bet-against positions are bets on the bet event not happening.

When bet orders match, or are filled or executed, instances of the standardized bet contract are created and the traders that are parties to the instances of the standardized bet contracts are said to have taken bet positions in the standardized bet contract. The bet exchange platform matches bet-for open and bet-against open orders to match, fill or execute the instances of the standardized bet contract. Traders may also bid on or enter orders to close existing positions or open new ones once the trader has bet-for or bet-against positions. The bet positions that traders take in the instances of standardized bet contracts may rise and fall in value based on matched orders. The value of the standardized bet contracts at the time the instance of the contract is generated is based on the amount that each trader is willing to pay on the bet event happening or not happening. The value of the contract may then change as other traders send bet orders on the bet event and the bet orders are matched.

A bet quote may be maintained for each standardized bet contract and displayed to traders as described below with reference to FIGS. 11-15, which depict various user interfaces. The bet quote may include information about the value of the bet to enable traders to assess a risk of placing a bet on the bet event. Such information may include, more or less, the last trade value, the highest amount bet, the lowest amount bet, and/or other types of information.

The occurrence of the bet event may be subject to probabilities or statistics of the performance of the player or players that are the subject of the bet event. For example, the bet event may be whether Mitch Trubisky, the Bears quarterback, scores three touchdown passes in a specific football game. A trader may bid for either a bet-for position on Trubisky scoring three touchdown passes in the game against the Lions, or a bet-against position on Trubisky scoring three touchdowns. Traders can research Trubisky's past performances and the Lions' ability to stop Trubisky and other quarterbacks. The trader may research factors related to venue, weather, injury reports, news reports on the Lions fitness, news reports on Trubisky's fitness, and other relevant factors before determining the best order-making strategy to pursue.

The trader may place orders to open bet-for or bet-against positions on any of the bet events that may be posted on the bet exchange at any given time. A trader places a buy-to-open order (BTO) to place an order on a bet-for position. A trader places a sell-to-open order (STO) to place an order on a bet-against position. Once a trader has opened positions, the positions may be closed, partially closed, added to, or held. A bet-for position (made with a BTO) may be closed or partially closed when the trader places a sell-to-close (STC) order. A bet-against position may be closed or partially closed when the trader places a buy-to-close (BTC) order.

In an example implementation, users of the bet exchange system, also referred to as traders in this description, create a user account in the bet exchange system. The trader's user account may include login information and information about the trader, such as name, email address, phone number, address, etc. The user's account may also include an available balance, which may include an amount in currency that the trader has in funds to use for bet orders. The traders' available balance may be linked by the traders to corresponding financial resources from which electronic fund transfers may be conducted. Such resources include, for example, bank accounts, credit cards, debit cards, electronic fund transfer sites (e.g. PayPal, Venmo, etc.) and other similar resources.

In an example implementation, when a trader obtains a bet position in a standardized bet contract, an amount being wagered by the trader is based on a standardized payout amount. The amount wagered at the time a standardized bet contract is executed may be transferred from the traders' available balances into an escrow to be held until the bet positions in the standardized bet contract are finalized, closed, or otherwise modified by the trader. If the bet event is finalized and the standardized bet contract settles, an amount based on the standardized payout amount is transferred from escrow to the available balance of the trader having the winning bet position (i.e. the bet-for position if the bet event occurs, or the bet-against position if the bet event does not occur). Transfers in and out of the traders' available balances may occur until the bet event occurs as traders modify their bet positions as described below.

In example implementations, the payout amount may be standardized in that the amount is the same payout for all standardized bet contracts. In some implementations, the payout amount may vary with standardized bet contracts.

In example implementations, traders may take positions in a standardized bet contract in multiple shares. For example, traders may place orders as bet orders that include an order type (e.g. BTO, STO, BTC, STC orders), a limit amount, and a share quantity. The share quantity effectively multiplies a trader's position, amount risked, and amount won or lost. A trader's BTO order may be for a share quantity at a limit amount per share. The total amount the trader bets would be the standardized payout amount multiplied by the share quantity. Should the bet-for position win the bet event, the amount won by the trader would be the standardized payout amount multiplied by the share quantity. Examples are described further below with reference to FIGS. 5A and 5B.

The bet orders have the potential of affecting the value of bet positions, which may be assessed by a trader using the bet quote and other information that may be displayed to the trader. In an example implementation, a bet quote includes a high buy value, a low sell value (from the bet-for perspective), and a last trade value. The high buy value is the highest amount per share of all of the unexecuted buy orders that are open on the order book at any given point in time. The low sell value is the lowest amount per share, from the bet-for perspective, of all of the unexecuted sell orders that are open on the order book at any given point in time.

The high buy value and low sell value for each standardized bet contract may be displayed to traders in the bet quote and updated in real-time as the values are changed. For example, when a buy order is received, it is compared with existing unfilled sell orders to determine if the received buy order is immediately executable. If it is, an instance of the standardized bet contract is generated and the high buy value in the bet quote does not change. If, however, no unfilled sell order can create a match with the buy order, the buy order is stored in an order book. If the limit amount per share indicated in the received buy order is higher than the current high buy value in the bet quote, the high buy value is changed to the limit amount per share of the received buy order.

Similarly, when a sell order is received, it is compared with existing unfilled buy orders to determine if the received sell order is immediately executable. If it is, an instance of the standardized bet contract is generated and the low sell value in the bet quote does not change. If, however, no unfilled buy order can create a match with the received sell order, the sell order is stored as unfilled in the order book. If the limit amount per share indicated in the received sell order is lower than the current low sell value in the bet quote, the low sell value is changed to the limit amount per share of the received sell order.

When instances of standardized bet contracts are generated, the trade value of the generated standardized bet contract becomes the last trade value in the bet quote. The changes in these values in the bet quote informs traders as to the value of the bet and the risk of betting for one side or the other. The floating value of the bet provides liquidity as well as data reflecting odds on the event occurring.

As described above, the buy and sell orders received from client devices are first checked to determine if they are immediately executable. If an existing unfilled order can be matched with a newly received order, the two orders enter into a standardized bet contract. If a newly received bet order cannot be immediately executed, the bet order is added to an order book. The bet orders may also be separated so that the order book may have a buy side and a sell side. Buy orders are stored on the buy side of the order book, and sell orders are stored on the sell side. The bet orders may also be sequenced in order of value first, then in order of time received for orders having the same limit amount per share. Buy orders may be sequenced from highest to lowest. In an example implementation, sell orders may be sequenced lowest to highest from a bet-for perspective. In an example implementation, the order book contains all unfilled bet orders on the same bet event for each standardized bet contract on which traders can take bet positions. In this way, the value of a bet may be affected by the traders having bet positions in the bet event providing liquidity to the value of the standardized bet contracts in the bet exchange.

As noted above, bet orders may include a limit amount per share and a share quantity for a given order type. The limit amount indicates a maximum amount the trader is willing to pay to make the bet. In an example implementation, traders enter orders with a limit amount per share from the perspective of the bet-for order. The amount actually paid by the buyer and the seller depends on the order type, the share quantity, and the standardized payout amount. When a buy order meets a sell order a trade amount per share is determined. The trade amount per share between a received bet order and an unfilled bet order in the order book is the limit amount per share of the bet order in the order book (or more generally, the bet order that was received first in time) from the perspective of the bet-for order. When (for example) a STO order is received and meets an unfilled BTO order in the order book, the trade amount per share is determined to be the limit amount of the BTO order. Since the limit amount per share of the received BTO order is the value from the bet-for perspective, the limit amount per share is used as the trade amount per share in the match. The BTO order maker would pay the trade amount per share multiplied by the maximum number of shares that can be bought by the match. If the share quantity in the BTO order is less than or equal to the share quantity indicated in the STO order, then the match is made for the share quantity in the BTO order. Otherwise, the match is made for the share quantity in the STO order. In generating instances of the standardized bet contract from the match, the STO order maker pays an amount equal to the standardized payout amount minus the trade amount per share with the difference multiplied by the share quantity of the match.

When (for example) a BTO order is received and meets an unfilled STO order in the order book, the trade amount per share is determined to be the limit amount per share of the STO order from the bet-for perspective. The trade amount per share from the bet-for perspective limit amount per share in the STO order. The BTO order maker would pay the limit amount per share multiplied by the number of shares indicated in the share quantity of the match. The STO order maker pays an amount equal to the standardized payout amount minus the trade amount per share with the difference multiplied by the share quantity of the match.

Similarly, when a BTO order meets a STO order, and the STO order is entered before the BTO order, trade value is the amount of the STO order as it was entered from the bet-for perspective. In other implementations, the trade value of a standardized bet contract between the two orders may be the standardized payout amount minus the limit amount of the STO order when entered as the most the STO order maker is willing to pay to own a bet-against position. If the standardized payout amount minus the trade value (limit amount of the STO order) is less than or equal to the limit amount of the BTO order, the standardized bet contract is executed, and an instance of the standardized bet contract is generated.

After a trader's bet order is filled and becomes a bet position in a standardized bet contract, the trader can hold the bet position, partially close the positions, fully close the position, or add to the position as factors change. Traders can also edit their bet positions after the real-life event on which the bet is based has started. The trader can partially close the bet position by adding to the position or by closing the position entirely.

A trader may add to, partially close, or fully close a bet position by placing a BTC or STC order. For example, a trader having a bet-for position on a bet event may edit or close the position by sending a STC order. A trader may want to close a bet-for position because something may have happened to change the odds of the bet event happening. The trader may then want to cash out on the bet event at a new higher value (if the bet event is more likely to happen) or at the same or at a new lower value (if the bet event is less likely to happen and the trader is cutting losses).

The STC order may be matched with a BTO order or a BTC order. When the STC order meets a BTO order, the prior bet-for position is closed at, likely, a new value for the trader making the STC order. The bet-for position at the new value is transferred to the BTO order maker. When the STC order meets a BTC order, the STC order maker receives the last trade value of the match and the BTC order maker receives the standardized payout amount minus the last trade value. The bet positions of the STC order maker and the BTC order maker both disappear.

Further for example, a trader having a bet-against position on a standardized bet contract may fully close or partially close the position by sending a BTC order. The trader may want to cash out of the standardized bet contract at a new higher value (if the bet event is less likely to happen) or at the same or at a new lower value (if the bet event is more likely to happen and the trader is cutting losses). The BTC order may be matched with a STO order or a STC order. When the BTC order meets a STO order, the prior bet-against position is closed at, what is likely, a new value for the trader making the BTC order. The bet-against position at the new value is transferred to the STO order maker. When the BTC order meets a STC order, the BTC order maker receives the standardized payout minus the last trade (value of bet against position) and the STC order maker receives the value of the bet-for position (same as last trade).

As noted above, the bet exchange system operates on a computing device, such as a server or multiple servers, or in a cloud computing environment. In the following description, it shall be understood that bet orders, bet positions, user accounts, money balances, point balances, bet contracts, standardized bet contracts, and other terms used below in describing the bet exchange system correspond to data records suitably structured and stored in a system database.

FIG. 1 is a block diagram of a bet exchange system 100. The bet exchange system 100 includes a bet exchange service platform 104 connected to the Internet 110 and configured to communicate over the Internet 110 with client devices, such as a first client device 102a and a second client device 102b as shown in FIG. 1. Users of the bet exchange system 100 access the exchange services and features using the client devices 102a, b. The client devices 102a, b may be computing devices such as smartphones, tablets, laptop computers, desktop computers, thin-client computers, and other types of devices configured to communicate over the Internet 110 and to operate a betting service app 106. Each client device 102a, b shown in FIG. 1 includes the bet exchange client application (or app) 106a, b, respectively, to provide the users, or traders, with access to the features of the bet exchange system 100.

The bet exchange service platform 104 includes the hardware and software components for implementing a bet exchange, such as for example, a processor 108, a user interface 111, a data network interface 112, a bet exchange application 114, and a system database 118. The processor 108 may be a computing element or elements that may be configured to provide a bet exchange service to multiple users over the Internet 110 and having enough processing power and speed to perform bet trading in high volumes. Such a computing element may be implemented in the form of one or more servers, or a comprehensive computing services platform such as the type provided by cloud computing.

The data network interface 112 connects the bet exchange service platform 104 to the Internet 110 to communicate with the client devices 102a, b. The bet exchange service platform 104 may also connect through the Internet 110 with media services for information related to bet events in general. For example, the bet exchange service platform 104 may monitor the status of real-life events having standardized bet contracts on which traders have taken bet positions. Such real-life events may include for example, sporting events, or other events happening and being reported in the media. The system database 118 includes any memory storage required for operation of the bet exchange service platform 104. The system database 118 may store executable programs that comprise a bet exchange application 114. Some of the memory components may be accessible from servers over the data network 110. Software components such as executable code for the bet exchange application 114 may be stored and executed on one or more servers, or in a cloud software service.

A user interface module 111 may be used to manage information to be provided to the traders on the corresponding client devices. A display generator 115 may format display screens with prompts, or data input fields to allow traders to select bet contracts, enter requests for bet orders, requests to receive bet quotes, and requests for a bet order with an order type and a limit amount. An input data interface 117 may receive data from the traders at their client devices in an appropriate context for fulfilling the above requested actions.

The system database 118 also stores data records corresponding to data objects generated and processed in the bet exchange system. For example, the system database 118 may store data records that correspond to available standardized bet contracts 140. The available standardized bet contract 140 may be related to events in sports such as American football, football (or as it is known in the United States, soccer), baseball, basketball, hockey, or any sport having a fanbase of potential users. In an example implementation, the bet exchange is made available for trading bets related only to sporting events. In other implementations, the bet exchange may allow for trading bets related to any real-life event. For example, a standardized bet contract may be created around a presidential election where a bet event may be, for example, whether a candidate will win the 2020 presidential election for $10. The entertainment world may be another area in which real-life events may be a source of bets. For example, a standardized bet contract may be created around the series "Game of Thrones," where the bet event may be, for example, "Arya Stark to kill the Night King for $10." The data comprising each available standardized bet contract 140 that may be stored in the system database 118 includes the subject and measure of the bet event. The available standardized bet contracts 140 may be displayed as a list to the traders on the corresponding client devices 102.

In an example implementation, each standardized bet contract may be is a data record comprising a bet event identifier, a standardized payout amount, and a bet quote. Each standardized bet contract corresponds with the bet event for which it was created. A bet event is any conceivable event that may or may not happen and on which traders may place a bet on whether the event happens. Bet events may include a subject such as, for example, a player in a sporting event, a statistical milestone such as, for example, a performance goal. One example of a bet event may be a quarterback in a football game (e.g. Tom Brady as the subject of the bet event) throwing for 3 touchdowns (the statistical milestone). Traders bid on bet positions in the standardized bet contracts. Each filled standardized bet contract, that is, each standardized bet contract in which a bet-for order meets a bet-against order, is an instance of the standardized bet contract. Each instance of the standardized bet contract further includes a bet-for position and a bet against position. In example implementations, instances of standardized bet contracts further include a share quantity indicating a number of shares for which the bet positions are opened. The bet quote for each standardized bet contract may be provided with each instance of the standardized bet contract to provide to the traders having the bet positions on the standardized bet contract information relating to the potential value of the bet.

The bet exchange application 114 creates and manages for each trader, a trader holdings record 116a, b comprising information relating to the trader's bet positions. FIG. 1 depicts two trader holding records 116a and 116b for traders 1 & 2, respectively. Each trader holding record 116a, b includes the trader's bet portfolio 122a, b, a bet watchlist 124a, b, an available balance 126a, b, and a list of any unfilled orders 128a, b placed by the traders 1 and 2 in an order book 130 waiting to be matched. The bet portfolio 122a, b includes the trader's bet positions in instances of standardized bet contracts. The bet watchlist 124a, b includes a list of standardized bet contracts and/or instances of standardized bet contracts selected by the trader to more closely monitor. The trader may select standardized bet contracts in which the trader may have an interest in taking a position depending on how circumstances affecting the bet event unfold. The trader may also select instances of standardized bet contracts in which the trader already has a position to more closely monitor in case the trader wishes to modify the positions as circumstances affecting the bet event unfold. The available balance 126a, b includes the trader's available amount in funds with which to make bet orders. The unfilled orders 128a, b includes bet orders that the trader has placed, but have not been filled and are waiting for a match.

Traders connect to the bet exchange service platform 104 to interact with the bet exchange application 114 via the user interface device on the trader's client devices 102a, b. The bet exchange application 114 generates user interface forms or displays and send the displays to the trader client devices 102a, b. The user interface provides traders with functions to open orders, close orders, review bet quotes, review bet lists, and other actions as traders in the bet exchange system.

The bet exchange application 114 receives requests for information or actions in the form of electronic messages over the Internet 110 from the traders. Such requests include bet orders to open positions in standardized bet contracts, or to close or modify existing bet positions.

Bet orders are received at the bet exchange application 114 from traders for a bet position on one of the standardized bet contracts 140. Bet orders may be sent by the traders at any time between the time the standardized bet contract is made available for betting until the time result of the bet event in the standardized bet contract either occurs or does not occur with finality.

Bet orders may be received at a queue or queues for processing on a first-received, first-processed basis. When received, bet orders are compared with any existing unfilled bet orders in the order book 130 to determine if the received bet orders can be executed. Two orders match for immediate execution based on order type and amount bet by the traders. In an example embodiment, the received bet orders are compared with unfilled orders in the order book 130 to determine if they are immediately executable, and if not, the received bet orders remain unfilled and stored in the order book 130.

The unfilled bet orders in the order book 130 may be sequenced according to value and time of entry into the order book. The sequencing may result in a more time-efficient comparison between bet orders, which would be beneficial whenever trading is conducted in high volume.

In an example implementation, a bet exchange core module 156 performs a matching process, examples of which are described in more detail below with reference to FIGS. 2-5B. The matching process compares bet orders of different types based on order type and limit amounts entered by the traders that made the bet orders, or order makers. An instance of a standardized bet contract is generated when a suitable comparison matches two orders based on a bet both order makers would make on opposing positions.

The instance of the standardized bet contract between two orders to open positions, such as a BTO order and a STO order, creates bet positions for both parties. A bet-for position is created for the order maker that made the BTO order and a bet-against position is created for the order maker that made the STO order. Information relevant to the bet position of each trader is added to the current positions list 122a, b in each trader entry 116a, b. In an example implementation, the trader's positions list 122 may include, for each bet position in the list, the bet quote for the bet event, the total number of bets or shares taken, the amount paid for each share, and a total current value of the bet position based on the latest trade value in the bet quote. Other items of information may be added to the trader's positions list, such as for example, a current value, a percent change in value, and other information.

In example implementations, the bet exchange application 114 includes a bet position modifier 158 to implement the closing of and the adding-to of existing positions. The standardized bet contract generator 156 matches BTC and STC orders with open or close buy and sell orders as described below with reference to FIGS. 5A-6. The bet position modifier 158 performs the modifications to the bet positions that each trader holds in the relevant transaction.

Traders may make buy or sell orders that may not execute for a not insignificant amount of time. Such orders may remain unfilled for a substantial amount of time, or in some cases, may never get filled or matched. Unfilled orders may be stored as data records corresponding to the traders that placed the orders in an unfilled order list 128a, b in the trader entries 116a, b, respectively. The unfilled orders in the unfilled orders list 128a, b also correspond to unfilled orders stored in the order books.

When the bet event that is the subject and measure of a standardized bet contract either occur or do not occur, the system application 114 determines if the status of the bet event is final. For example, some bet events may happen before the end of a real-life event that forms the context of the bet event. For example, the bet event may be whether a quarterback will score three touchdowns and it may happen before the end of the football game that forms the context of the bet event. The quarterback may score the three touchdowns in the first quarter or may be injured and unable to complete the game before completing the three-touchdown goal of the bet event. When the system determines that the state of the bet event is final, a fulfillment module 160 may perform the fulfillment of the bet by awarding the payout to the trader that won the bet.

The bet exchange service platform 104 may provide a user account and/or profile data storage and maintenance system. Traders may be guided to create such user accounts or profiles through the user interface employing forms with prompts for entry by the user of the relevant data. The user account data is stored and maintained for access by the user as desired. When the trader creates the user account the user interface forms prompt the trader via the user interface 111 for the relevant information to be stored in the user's account 122. Such information may include, for example, name and login information for performing user login and signup. The traders 116 may also be provided with a notifications list 124 for storing a list of messages sent by the system to the trader.

Figure 2:
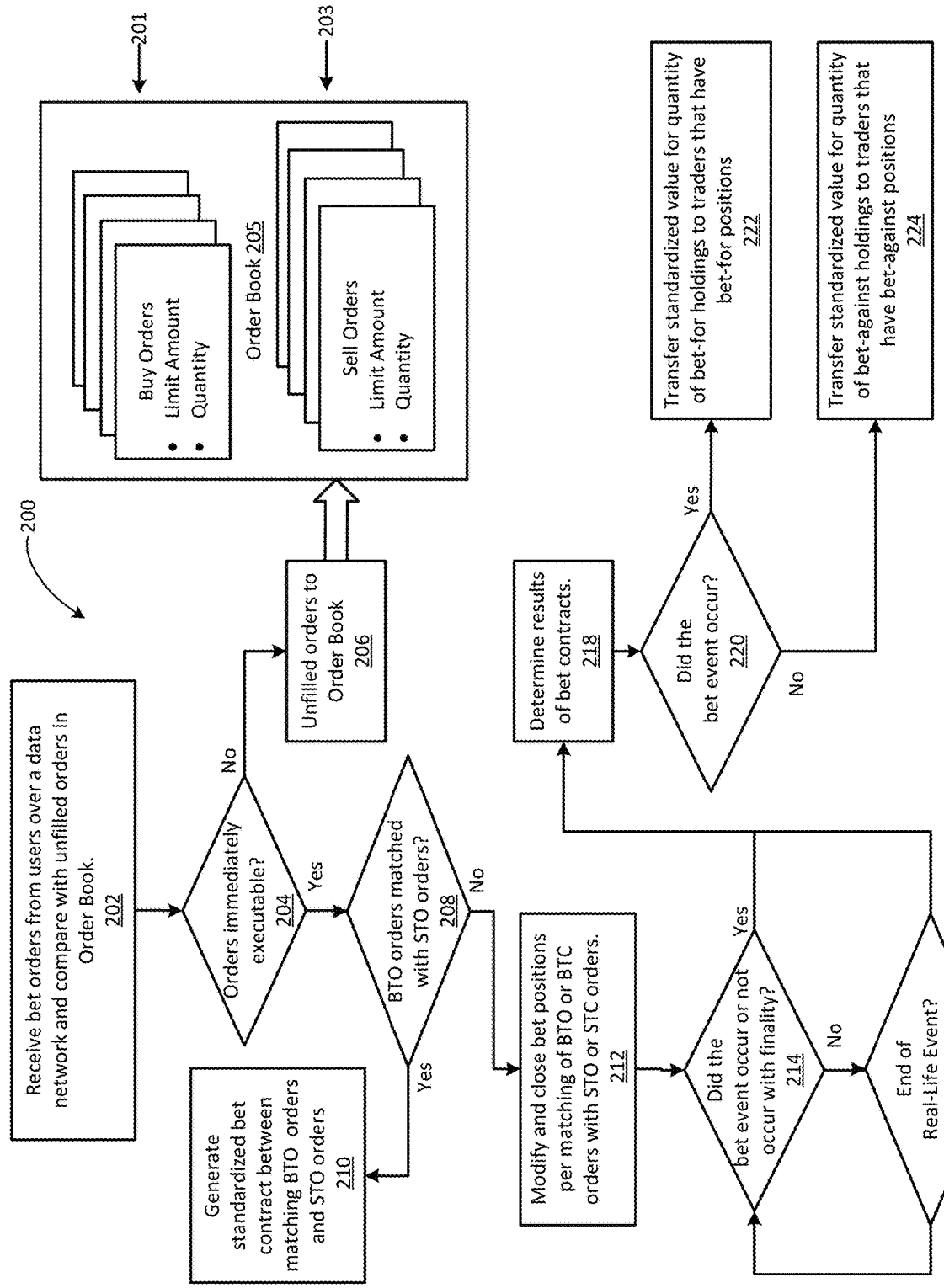
FIG. 2 is a flowchart illustrating operation of an example method for implementation of a bet exchange application in the system in FIG. 1.

FIG. 2 is a flowchart 200 illustrating operation of an example method for implementation of a bet exchange application in the system in FIG. 1. In the description of the flowchart in FIG. 2, any hardware components referenced as performing any of the functions described shall refer to components in FIG. 1 unless stated otherwise.

In an example implementation, the bet exchange system 100 operates by receiving at the bet exchange platform 104 a plurality of bet orders as shown at step 202. The bet orders are received over the Internet from client devices operated by the traders. The bet orders are received as traders send the orders from the client devices 102 and may arrive in large volumes in a short amount of time. Each bet order represents a bid for a bet position on one of the standardized bet contracts. In the flowchart 200 in FIG. 2, steps 202 through 216 are continually executing during the time period in which a bet event in the subject standardized bet contract is active or live. A bet event in a standardized bet contract is live starting from when it is activated by the system until the outcome of the bet event is final. Step 202 may be continuously receiving bet orders in that time period.

At decision block 204, the bet orders received over the Internet 110 are compared with existing open bet orders, which may be bet orders in an order book 205, to determine if any of the received bet orders are immediately executable. This comparison is described in more detail below with reference to FIGS. 3-5B. Decision block 204 involves comparing the received bet orders (from step 202) with unfilled orders in the order book 205. In general, a match may be deemed executable if the value placed on the bet position for which the trader made the received bet order substantially matches the value placed on the opposite bet position for which another trader made the bet order in the order book 205 below a limit set by both parties. At decision block 204, if any received bet orders are not immediately executable (i.e. no matching opposite bet orders were found in the order book 205 during the comparison), the unmatched received bet orders are moved into the order book 205 as unfilled bet orders at step 206.

The bet orders may be bet-for orders or bet-against orders. In an example implementation, bet-against orders are also referred to as sell orders and bet-for orders are also referred to as buy orders. The unfilled bet-against, or sell, orders may be stored on a sell side 203 of the order book 205 separate from bet-for orders, or buy orders, which may be stored on a buy side 201 of the order book 206. The limit value in the buy order represents a maximum amount the buy order maker is willing to bet on the bet event happening. The limit amount in the sell order represents the maximum amount the order maker would like to see the trade executed at from the bet-for perspective, which will cap the amount they are willing to pay at standardized payout amount minus the trade value from the bet-for perspective.

As an example, trader 1 (FIG. 1) may communicate a bet order for a bet-for position at a set limit amount, which the bet exchange system 100 receives as a bet by trader 1 that the bet event will happen. The decision block 204 compares trader 1's bet order with unfilled sell orders in the order book 205. The decision block deems the buy order received from trader 1 executable when an unfilled sell order made by another trader, trader 2, for example, is found in the order book 205 such that the limit value of the unfilled sell order would not violate the limit value of the received buy order.

In an example implementation, bet orders may specify a quantity of positions, or shares. If two bet orders to open positions meet, the bet orders are deemed executable and an instance of a standardized bet contract is generated for a quantity equal to the lower quantity specified in the two matched bet orders. The bet order having the higher quantity becomes an unfilled bet order for the same limit value as the bet order having the higher bet quantity with a quantity of shares equal to the quantity of shares that remained unfilled.

As noted above, the bet orders are for one of two types of bet positions: a bet-for (or buy) position and a bet-against (or sell) position. The orders may be placed to open or close either type of bet position. In an example system, four types of orders may be received:

1. Buy-to-Open ("BTO") order: Order to open a desired number of bet-for (or buy) shares to bet on the bet event occurring at a limit amount, which indicates the maximum amount the trader is willing to bet.
2. Buy-to-Close ("BTC") order: Order to close a desired number of bet-against shares previously made by the trader. The limit amount in the BTC order indicates the maximum amount the trader is willing to pay to close the indicated number of shares in the position, which may be, more or less than, the amount the trader paid to acquire the bet position.
3. Sell-to-Open ("STO") order: Order to open a desired number of bet-against (or sell) shares to bet on the bet event not occurring at a limit amount, which indicates, directly or indirectly, the maximum amount the trader is willing to bet. The limit amount may be said to indirectly indicate the maximum amount the trader is willing to bet in an example implementation where the trading value of any order is viewed from the perspective of buy orders.
4. Sell-to-Close ("STC") order: Order to close a desired number of bet-for positions previously made by the trader at a limit value, which indicates, directly or indirectly, the maximum amount the trader is willing to pay to close the previously made sell position.

It is noted that the term "open" in reference to an order, or the term "open orders," shall refer to bet orders to add or acquire a position in a standardized bet contract that have not been filled or canceled. The term "unfilled orders" shall be used interchangeably with the term "open orders" to refer to orders that have not been filled or canceled. Position opening orders include both BTO and STO and are types of orders that, if filled, result in new positions to the order makers. Position closing orders include both BTC and STC orders and are types of orders that, if filled, result in the closure of existing bet positions. Bet positions are filled orders that are in an executed contract. A bet position may comprise a number of shares in the position in the bet event.

When a BTO order is matched with a STO order, an instance of a standardized bet contract is generated. When any combination of open orders (i.e. BTO or STO) is matched with any combination of close orders (i.e. BTC or STC), ownership in a bet position is transferred from the close order maker to the open order maker. When two close orders are matched, two existing instances of the standardized bet contract are merged into one instance of the standardized bet contract.

If at decision block 204, any newly received bet orders are deemed to be immediately executable, the process moves to decision block 208 to determine if the matched bet orders are a match between BTO orders with STO orders. At decision block 208, if a BTO order is deemed to be immediately executable with a STO order, the process moves along the YES path to step 210 to generate an instance of the standardized bet contract. If the bet orders found to be immediately executable at decision block 204 do not involve matches between BTO orders and STO orders, the process moves to step 212 (NO path). Step 212 processes matches involving any of the other four possible combinations of matches between bet orders. The first combination of matches is between BTO orders and STO orders. Step 212 processes the other three combinations, which include: BTO orders with STC orders, BTC orders with STO orders, and BTC orders with STC orders. The processing of the other three possible combinations of matches is discussed in more detail below with reference to FIGS. 4-6.

Referring to step 210 where the instance of the standardized bet contract is generated, the match between any of the BTO orders and one of the STO orders depends on the trade amount determined when the orders beet. In one example implementation, the trade amount is the limit amount of the bet order that was placed earlier in time, which will typically be the unfilled bet order in the order book 205. That is, with respect to a match between a received bet order and a bet order in the order book 206, the trade amount would be the limit amount of the bet order in the order book 206. When a new STO order is received and compared with an existing unfilled BTO order, the limit amount of the existing unfilled BTO order is determined to be the trade amount of a bet contract that may be executed between the two orders. Such a bet contract is executed if the limit amount of the existing BTO order is equal to or higher than the STO order being entered (because entered from bet-for perspective). The limit amount of the sell order is the maximum amount the order maker would like to see the trade executed at from the bet-for perspective. If this condition is met between the newly received sell order and the buy order in the order book 206, the match is made, and the trade amount per share from the bet-for perspective becomes the last trade value in the bet quote of the bet event.

Similarly, when a new BTO order is received and compared with an existing unfilled STO order, the limit amount of the existing unfilled STO order is determined to be the basis for the trade amount of a bet contract that may be executed between the two orders. In an example implementation, the trade amount is viewed from the perspective of the buy order. The trade amount in this case may be set to the standardized payout amount minus the limit value entered in the existing, unfilled STO order. In one example implementation, the limit value entered in the existing unfilled STO order may actually be a value that represents the amount paid by the trader that made the BTO order and reflecting the value from the buyer perspective. In that case, the bet contract is executed if the limit amount of the newly received BTO order is less than or equal to the determined trade amount (i.e. the standardized payout amount minus the limit amount of the existing, unfilled STO order).

The instance of standardized bet contract is generated at step 210 by deducting the trade amount from the BTO order maker's available balance and deducting the standardized payout minus the trade amount from the STO order maker's available balance. If a share quantity is specified in the bet orders, the limit amount per share deducted from both bet order maker available balances is multiplied by the lesser of the share quantities specified in the bet orders. In an example implementation, the amounts may be transferred to escrow, which may be defined using a data record in the system database. An escrow may correspond to a bet event so that the escrow maintains amounts relating to an individual bet event. The escrow may be used in any bet event to ensure that there are enough funds to payout when the bet contract settles. An escrow is funded when a standardized bet contract is generated, which is to say, when a BTO order meets a STO order. The total funded to escrow between the two order makers is the standardized payout amount, which is the trade amount (amount paid by the BTO order maker) plus the standardized payout amount minus the trade amount (amount paid by the STO order maker). Funds are drawn from escrow when the standardized bet contract settles or when, or when a BTC order is matched with a STC order. When a BTO or STO order is matched with a BTC or STC in any permissible combination (two opposite orders), the last trade value of the standardized bet contract transfers between the two traders, and no amount is transferred in or out of escrow.

When the instance in the standardized bet contract is generated, the bet positions generated by the bet contract are stored in the trader's bet portfolio 122 (in FIG. 1). The bet-for position is added to the bet portfolio of the trader that made the BTO order. The bet-against position is added to the bet portfolio of the trader that made the STO position. The bet-for and bet-against positions may be stored and displayed to the trader with a bet quote having data indicative of the value and risk of the bet event. The bet quote includes a highest buy value indicating a highest limit amount of all bet orders for the bet event, a lowest bet-against value (from a bet-for perspective) indicating a highest positional value of all bet orders for the standardized bet contract, the last trade value indicating the trade amount of the last bet contract executed. In an example implementation, other data may be added with the bet quote to a dashboard, such as for example, historical data indicating the history of the bet value of the standardized bet event. The bet-for position and the bet-against position in the bet portfolios may also include the quantity of shares in the contracts, the amount paid for the position, and the current market value of the position.

After the standardized bet contract is executed, the trader can monitor the floating value of the standardized bet contract by referring to the trader's bet positions on the bet portfolio, which may be displayed on the trader's client device user interface. The trader may also monitor the trade value of the bet position by accessing the current bet quote for the standardized bet contract in other user interface displays. The trader may modify add to, hold, or close existing bet positions at any time before the standardized bet contracts settle, which is when the bet event has occurred or not occurred with finality. Typically, the bet events are in the context of real-life events in which the subject of the bet event is playing. It is possible for the bet event to occur at any time before the end of the real-life event. However, in some example implementations it may be preferred that the bet event expires and is therefore settled at the end of the real-life event regardless of when the bet event occurs or does not occur to ensure anything that affects the bet event does not change its occurrence. In an example implementation, a state of finality may be defined for bet events in general.

At decision block 214 in FIG. 2, the real-life event is checked to determine if the bet event identified in the standardized bet contract has occurred or not occurred with finality before the real-life event has ended. For example, if the identified bet event is, for example, "Pat Mahomes will throw for three touchdowns," the bet event is deemed to have occurred with finality once Pat Mahomes' third touchdown pass becomes part of the official NFL record for the football game, or real-life event for which the standardized bet contract was created. The finality of the occurrence of the identified bet event may occur before the end of the football game.

However, it is possible that Pat Mahomes is forced to leave the football game, such as through injury or through ejection, before he has thrown his third touchdown pass. In such a scenario, the identified bet event is deemed to not have occurred with finality. It is noted that the bet exchange service platform 104 includes a data network interface 112 to communicate over the Internet 110. This access to the Internet 110 allows for easy access by the bet exchange service platform 104 to media sites 160 that may be used to monitor the status of a real-life event in virtual real time or to obtain relevant information at any time. The bet exchange application 114 may include program functions that access such information from the media and analyze the information to decide on an end to a real-life event, or on whether or not a bet event occurred or did not occur with finality.

If at decision block 214, the bet event of the standardized bet contract occurred with finality, the instances of standardized bet contracts for the bet event are analyzed to determine how they should be settled. Decision block 220 checks if the bet event occurred. If the bet event occurred (YES path), the standardized payout amount adjusted for the number of shares at stake is transferred to the traders having bet-for positions in the standardized bet contract at step 222. If the bet event did not occur (NO path), the standardized payout amount adjusted for the number of shares at stake is transferred to the traders having bet-against positions in the standardized bet contract at step 224.

If at decision block 214, the bet event of the standardized bet contract did not occur with finality (NO path), the real-life event that forms the context of the bet event is checked to determine if the real-life event has reached an end at decision block 216. If the real-life event has not ended (NO path), the system may continue to check for whether or not the bet event has occurred at decision block 214. It is noted that until decision block 216 determines that the real-life event has ended, the operation illustrated by steps 202 through decision block 214 continues to proceed as bet orders continue to be received by the system. If at decision block 216, the end of the real-life event has been detected (YES path), the results of the standardized bet contracts are determined at step 218. Settlement then proceeds at decision block 220 and steps 222 and 224.

Figure 3:
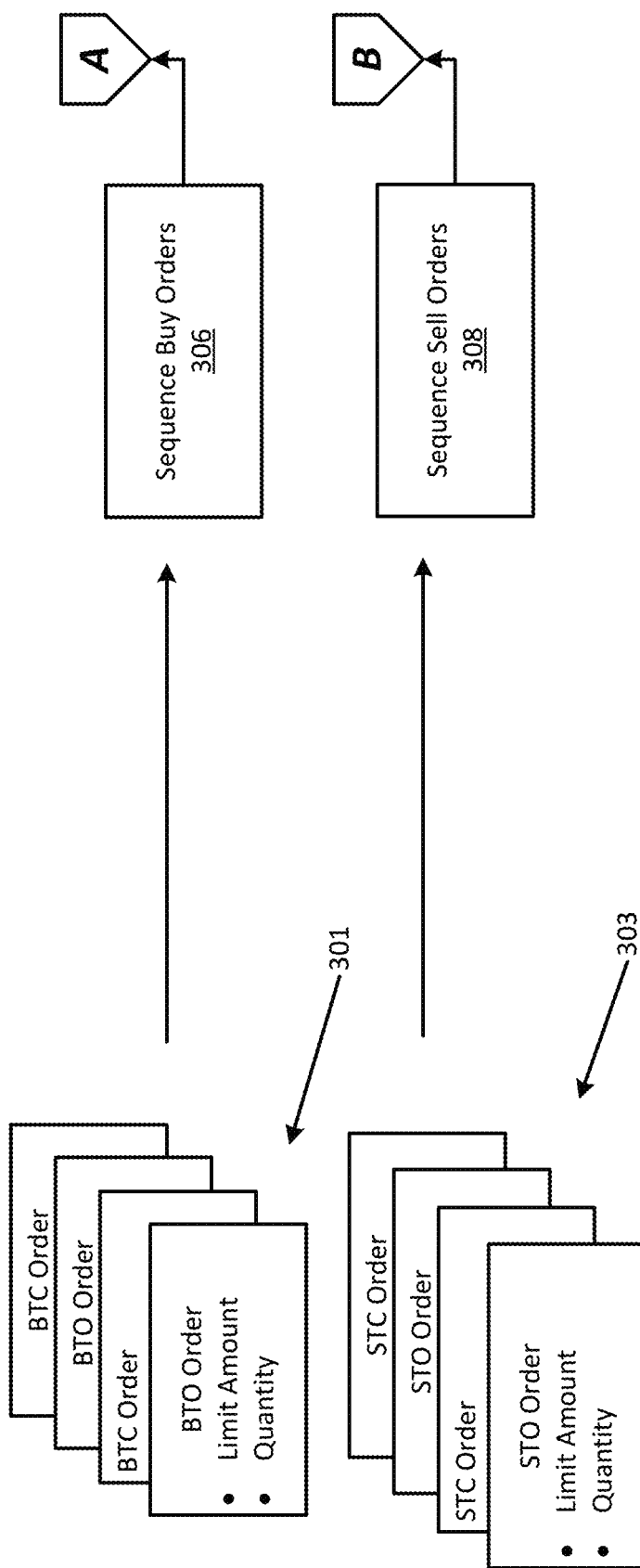
FIG. 3 is a schematic diagram illustrating a sequencing operation in the method used to implement an example bet exchange application.

FIG. 3 is a schematic diagram illustrating a sequencing operation performed by the bet exchange application 114 as bet orders are received. In an example implementation, bet orders are sequenced according to type. Bet-for (BTO or BTC) orders 301 are sequenced at step 306 separately from bet-against (STO or STC) orders 303 at step 308. It is noted that the plurality of buy orders 301 includes BTO orders and BTC orders. The plurality of sell orders 303 includes STO orders and STC orders.

The sequencing of the buy orders at 306 results in the buy orders organized in order from highest value to lowest value. The sequencing of the sell orders at 308 results in the sell orders organized in order from lowest to highest value from the bet-for perspective. That is, the sell orders are sequenced according to the value of the bet from the bet-for perspective, and not necessarily on what the sell order maker would expect to pay. Since the sell orders are entered from the bet-for perspective, the sell order maker is going to pay SP-LT.

Figure 4:
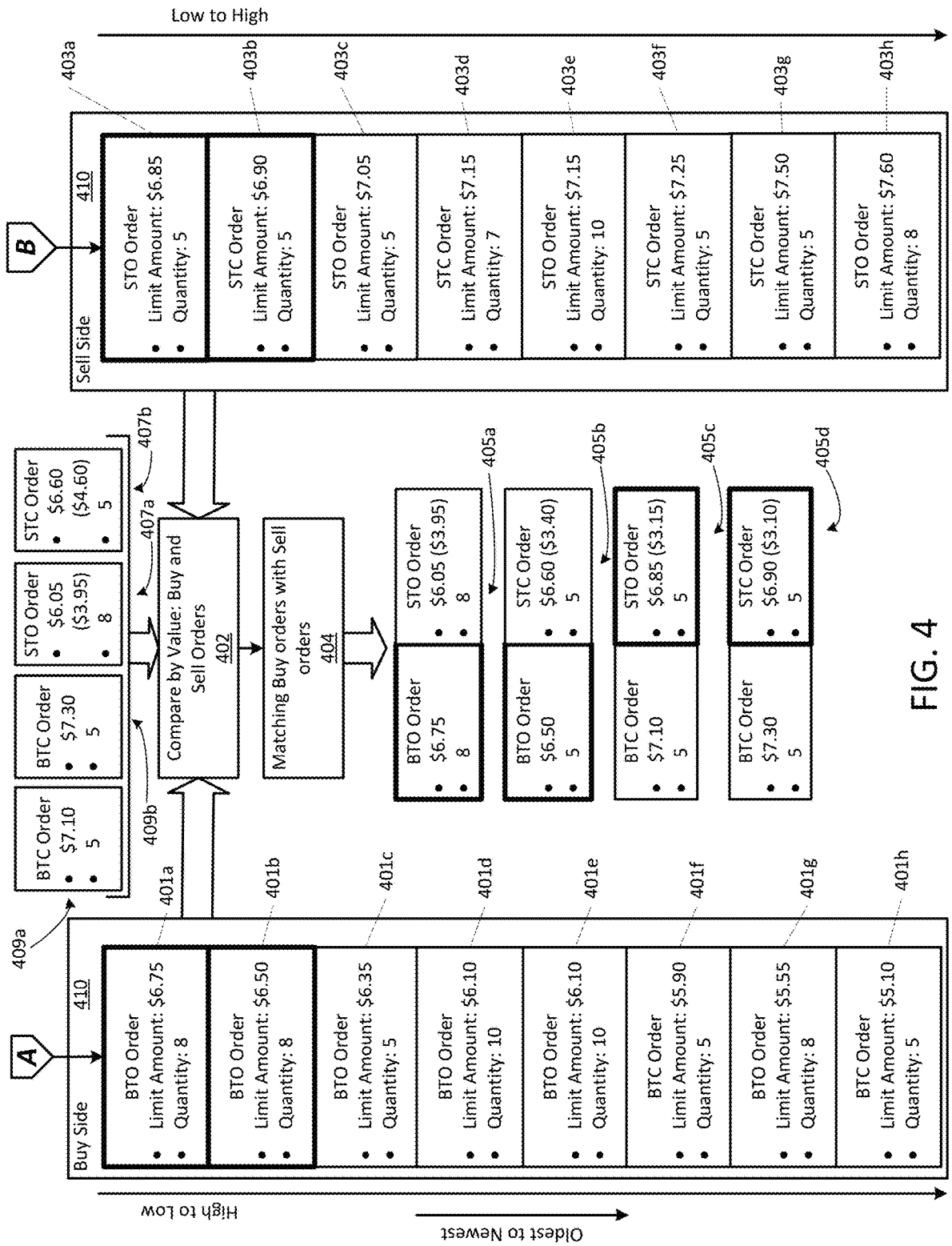
FIG. 4 is a schematic flow diagram illustrating an example matching process for matching sequenced bet-for orders with sequenced bet-against orders.

A set of sequenced buy orders 401 and a set of sequenced sell orders 403 are shown in FIG. 4. The sequenced buy orders 401 include the BTO order 401a first in the sequence with a limit amount of $6.75 and a share quantity of 8 shares. The next buy order is a BTO order 401b having a limit amount of $6.50, followed by a BTO order 401c at $6.35, a BTO order 401d at $6.10, another BTO order 401e at $6.10, a BTC order 401f at $5.90, a BTO order 401g at $5.55, and a BTC order 401h at $5.10. When two unfilled orders, such as BTO order 401d and BTO order 401e have the same value, the orders are sequenced from oldest to newest.

The sequenced sell orders 403 include the STO order 403a first in the sequence with a limit amount of $6.85 and a share quantity of 5 shares. The next sell order is a STO order 403b having a limit amount of $6.90, followed by a STO order 403c at $7.05, a STC order 403d at $7.15, another STO order 403e at $7.15, a STC order 403f at $7.25, a STC order 403g at $7.50, and a STO order 403h at $7.60. When two unfilled orders, such as STO order 403d and STO order 403e have the same value, the orders are sequenced from oldest to newest.

FIG. 4 is a schematic flow diagram illustrating an example matching process for matching sequenced buy orders 401 and sequenced sell orders 403 with bet orders that have been most recently received (received bet orders). The unfilled buy orders 401 and the sell orders 403 are stored in an order book 410 such that the buy orders 401 are separate from the sell orders 403. Unfilled buy orders 401 meet or are matched with newly received sell orders 407 to generate instances of the standardized bet contract. Unfilled sell orders 403 meet or are matched with newly received buy orders 409 to generate additional instances of the standardized bet contract. The order book 410 may include all unfilled orders for a bet event identified in a standardized bet contract.

The sequenced unfilled buy orders 401a to 401h are compared with the newly received sell orders 407, and the unfilled sell orders 403a to 403h are compared with the newly received buy orders 409 at step 402 to determine if a suitable trade amount can be determined between pairs of opposing orders. At step 404, buy orders that match with sell orders are processed based on combinations of buy and sell orders. In an example implementation, four combination types result from the matching. The first combination 405a is an unfilled BTO order 401a matched with a newly received STO order 407a. The second combination 405b is a BTO order 401b and a STC order 407b. The third combination 405c is a newly received BTC order 409a and an unfilled STO order 403a. The fourth combination 405d is a newly received BTC order 409b and an unfilled STC order 403b. The processing of these matches 405 is described below with reference to FIGS. 5A and 5B.

Figure 5A:
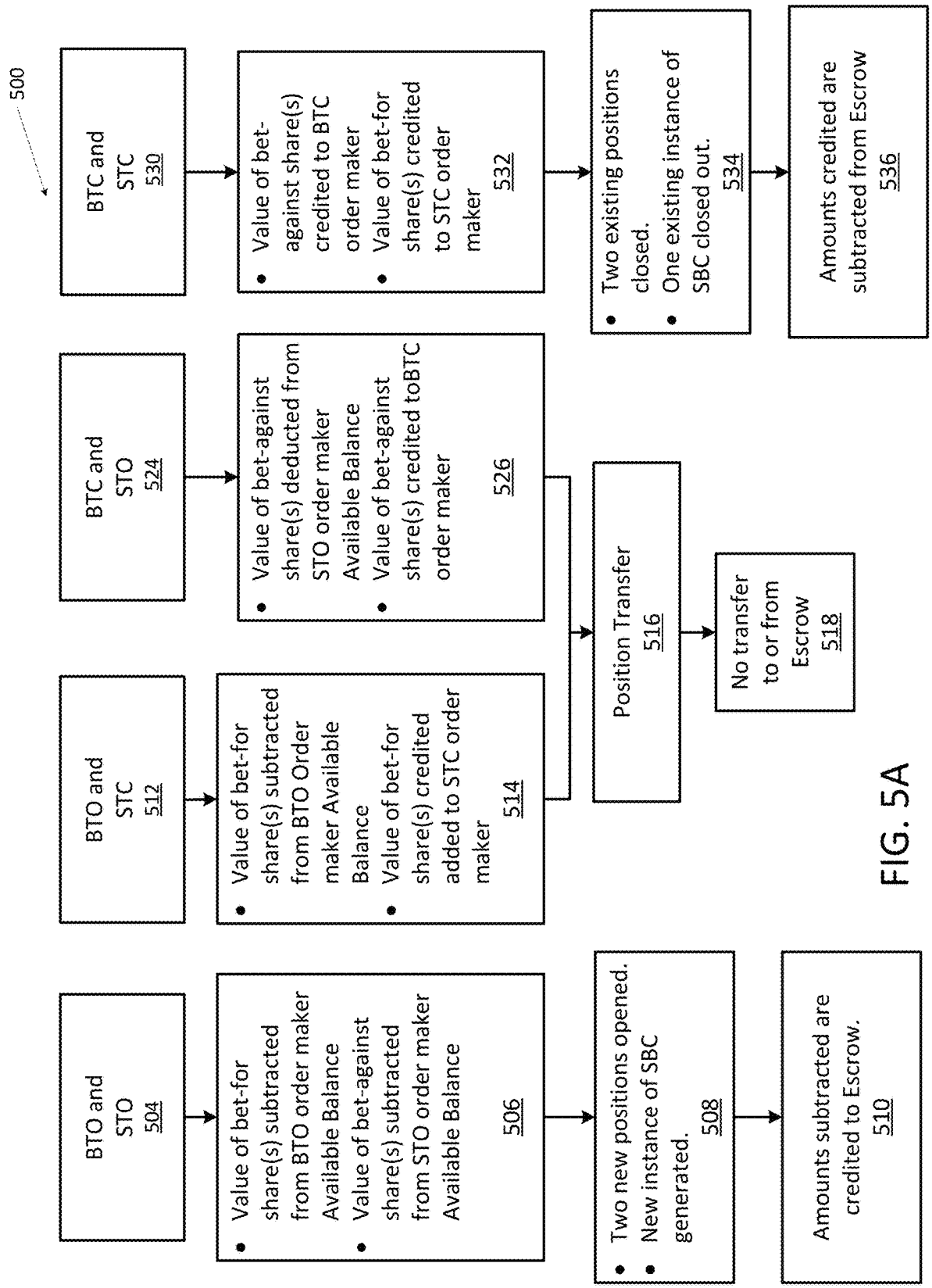
FIG. 5A is a flowchart illustrating operation of the matching different types of orders to open or close bet positions.

FIG. 5A is a flowchart 500 illustrating operation of examples of matching different types of orders to open or close bet positions. Step 504 matches a BTO order with a STO order at a determined trade amount per share. At step 506, the trade amount per share becomes the last trade value (LT). The trade amount is adjusted for a share quantity and the value of bet-for shares is subtracted from the available balance of the trader that made the BTO order. The value of the bet-for positions, which equals the last trade value (LT), is subtracted from the standardized payout amount and the difference adjusted for the share quantity. The value of the bet-against shares is subtracted from the available balance of the trader that made the STO order.

At step 508, an instance of the standardized bet contract is generated to create a bet-for position for the trader that made the bet-for order and a bet-against position for the trader that made the bet-against order. At step 510, the amounts subtracted from the traders' available balances in step 506 are transferred to escrow.

Figure 5B:
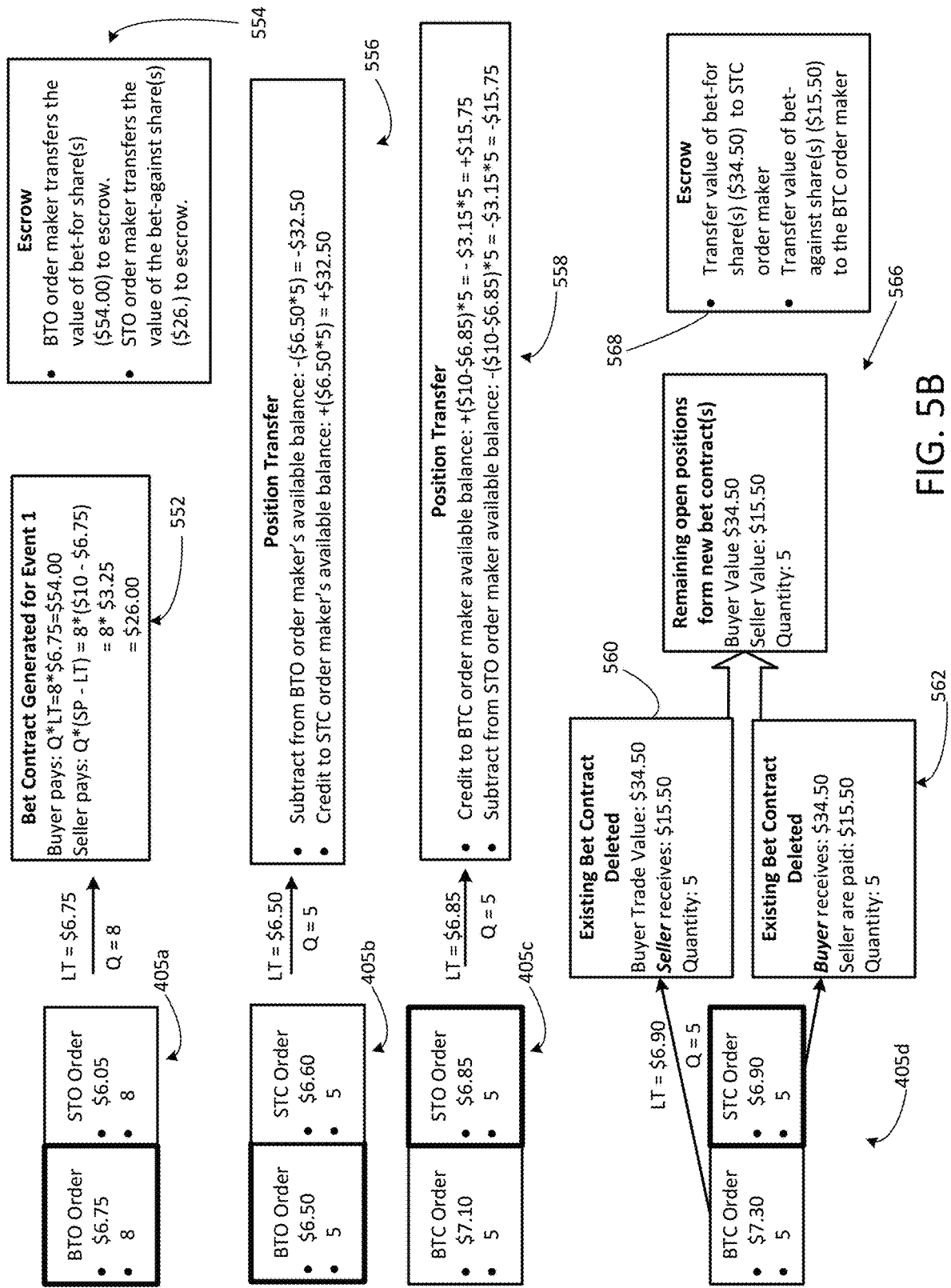
FIG. 5B is a schematic flow diagram illustrating examples of results of different combinations of matched orders.

FIG. 5B schematically illustrates the process of matching the BTO order and the STO order combination at 405a in FIG. 4. The BTO order in the combination 405a has a limit amount of $6.75 for 8 shares. The STO order has a limit amount of $6.05 for 8 positions. The trade amount is determined to be the limit amount of the BTO order as indicated by the bold border of the BTO order since the BTO order 401a is in the buy side of the order book 410 (in FIG. 4). The quantity of shares in the bet being traded in the combination 405a is 8, which is the amount available to both the BTO order (8) and the STO order (8). If the share quantity were not the same in the bet orders in the combination 405a, the match would be made for the smaller limit number between the two bet orders, and the bet order with the greater number of shares would go to the order book having a share quantity equal to the remainder of shares.

When the combination 405a is matched, an instance of the standardized bet contract 552 is created for the bet event 1 identified in the standardized bet contract. In creating the instance of the standardized bet contract 552, the buyer (BTO order maker) pays the last trade value per share ($6.75) multiplied by the share quantity (8) for the standardized bet contract. The seller (STO order maker) pays the standardized payout amount ($10 in this example, but it could be any predetermined value) minus the trade value per share (LT=$6.75, for a total of $3.25) multiplied by the share quantity for the bet contract (8). As shown in FIG. 5B, the buyer paid $54.00 and the seller paid $26.00. The amounts paid by the buyer and seller are transferred from their available balances to escrow 554.

Referring to FIG. 5A, step 512 matches a BTO order with a STC order. At step 514, the trade amount per share becomes the last trade value per share (LT) and a value of bet-for shares adjusted for the share quantity is subtracted from the available balance of the trader that made the BTO order. The last trade value (LT) adjusted for the share quantity of the match is added to the available balance of the trader that made the STC order. The result is a position transfer at step 516. That is, the interest bought by the trader that made the BTO order is transferred to the trader that made the STC order indicating the trader that made the STC order is "selling" his existing bet-for position to the BTO order maker. No transfer in or out of escrow follows this match as indicated at step 518.

Referring to FIG. 5B, the process of matching the BTO order and the STC order combination described in FIG. 5A is shown at 405b. The BTO order in the combination 405b has a limit amount of $6.70 for 5 positions. The STC order has a limit amount of $6.60 for 5 positions. The trade amount is determined to be the limit amount of the BTO order as indicated by the bold border of the BTO order. The quantity of shares traded in the combination 405b is 5, which is the amount available to both the BTO order (5) and the STO order (5). When the combination 405b is matched, a position transfer 556 is executed in which the trade value per share is $6.70. The available balance of the buyer (BTO order maker) is reduced by the last trade value ($6.70) multiplied by the quantity (5), which totals $33.50. The available balance of the seller (STC order maker) is credited by an amount equal to the last trade value ($6.70) multiplied by the quantity (5) for a total of $33.50. Again, the share quantities set in both bet orders in the combination 405b is the same (5). If the share quantities were uneven, the bet order with the larger number of shares is moved to the order book 410 with the same limit amount and a share quantity equal to the remainder of shares.

Referring to FIG. 5A, step 524 matches a BTC order with a STO order. The trade amount per share is the limit amount of the STO order as indicated by the bold border at 405c (in FIGS. 4 and 5B), which becomes the last trade value per share (LT). At step 526, a bet-against share value is determined to be equal to the standardized payout minus the last trade value per share multiplied by the share quantity of the trade. The bet-against share value is deducted from the available balance of the trader that made the STO order. In addition, the bet-against share value is credited to the trader that made the BTC order. The result is a position transfer at step 516. That is, the BTC order maker transfers the bet-against positions that the BTC order maker owned to the STO order maker. At step 518, there is no transfer in or out of escrow.

Referring to FIG. 5B, the process of matching the BTC order and the STO order combination is shown at 405c. The BTC order in the combination 405c has a limit amount of $7.10 for 5 positions. The STO order has a limit amount of $6.85 for 5 positions. The trade value per share is determined to be based on the limit amount of the STO order as indicated by the bold border of the STO order. In this example, the last trade value per share is SP-LT=$10–$6.85=$3.15. The quantity traded in the combination 405c is 5, which is the amount available to both the BTC order (5) and the STO order (5). When the combination 405c is matched, a position transfer 558 is executed in which the trade value is $6.85. The available balance of the BTC order maker is credited by an amount equal to the standardized payout amount ($10) minus the last trade value ($6.85) multiplied by the quantity (5), which totals $3.15*5=$15.75. The available balance of the BTC order maker is subtracted by an amount equal to the standardized payout ($10) minus the last trade value per share ($6.85) multiplied by the quantity (5) for a total of $15.75.

Referring to FIG. 5A, step 530 matches a BTC order with a STC order. At step 532, the trade amount per share becomes the last trade value per share (LT). A value of bet-against shares is determined to be the standardized payout amount minus the last trade value per share multiplied by the share quantity. A value of bet-for shares is determined to be the trade amount per share multiplied by the share quantity. At step 534, the bet positions held by the BTC order maker and the STC order maker are closed, which closes any instances to which the bet positions held by the BTC order maker and the STC order maker may have been a part of. The bet positions opposing each of the bet positions of the BTC order maker and the STC order maker remain open and may meet to generate a new instance of the standardized bet contract. At step 536, the amounts credited to the BTC order maker and the STC order maker are transferred out of escrow.

FIG. 5B schematically illustrates the process of matching the BTC order and the STC order combination at 405d. The BTC order in the combination 405d has a limit amount of $7.30 for 5 positions. The STC order has a limit amount of $3.10 for 5 positions. The trade value is determined to be the limit amount of the STC order as indicated by the bold border of the STC order. When the combination 405d is matched, an existing position belonging to the BTC order maker in the instance of the standardized bet contract 560 has the bet-against position (seller) eliminated. The existing bet-against position in the instance of the standardized bet contract at 560 is effectively sold by the BTC order maker for the value of the bet-against shares, which is $6.90*5=$34.50. In the matching of the combination 405d, an existing position belonging to the STC order maker in the instance of the standardized bet contract 562 has the bet-for position (buyer) eliminated. The existing bet-for position in the instance of the standardized bet contract at 562 is effectively sold by the STC order maker for the value of the bet-for shares, which is ($10–$6.90)*5=$15.50.

The instance of the standardized bet contract at 560 and the instance of the standardized bet contract at 562 are eliminated. The elimination of the bet-against position in the instance of the standardized bet contract 560 leaves the holder of the bet-for position (Buyer) with a current trade value of $6.90*5=$34.50. The elimination of the bet-for position in the instance of the standardized bet contract 562 leaves the holder of the bet-against position (Seller) with a current trade value of $15.50. The holder of the bet-for position in the instance of the standardized bet contract 560 and the holder of the bet-against position in the instance of the standardized bet contract at 562 form a new instance of the standardized bet contract at 566. The transfer of the values of the bet-for shares and the bet-against shares from escrow to the available balances of the BTC order maker and the STC order maker is shown at 568.

Referring to FIG. 4, it is noted that the highest value offered in a bet-for order in the order book 410 is the BTO order 401a, which is then matched with the newly received STO order 407a. When the instance of the standardized bet contract 552 (FIG. 5B) is generated, the BTO order at 401a is no longer an unfilled order, which means that the BTO order 401a is removed from the buy side of the order book 410. The BTO order 401b becomes the new highest value bet order for the unfilled bet-for orders in the order book 410. The BTO order 401b is then matched with a newly received STC order 407b, which means the BTO order 401b is removed from the order book 410 leaving BTO order 401c as the new highest value bet-for order.

On the sell side, the lowest value offered in a bet-against order in the order book 410 is the STO order 403a. When the STO order 403a is matched with a newly received BTC order 409a, the STO order 403a is removed from the sell side of the order book 410. The STC order 403b becomes the new lowest value offered in a bet-against order in the order book 410. The STC order 403b is then matched with newly received BTC order 409b, which means the STC order 403b is removed from the order book 410. The new lowest value offered in a bet-against order in the order book is then STO order 403c.

Figure 6:
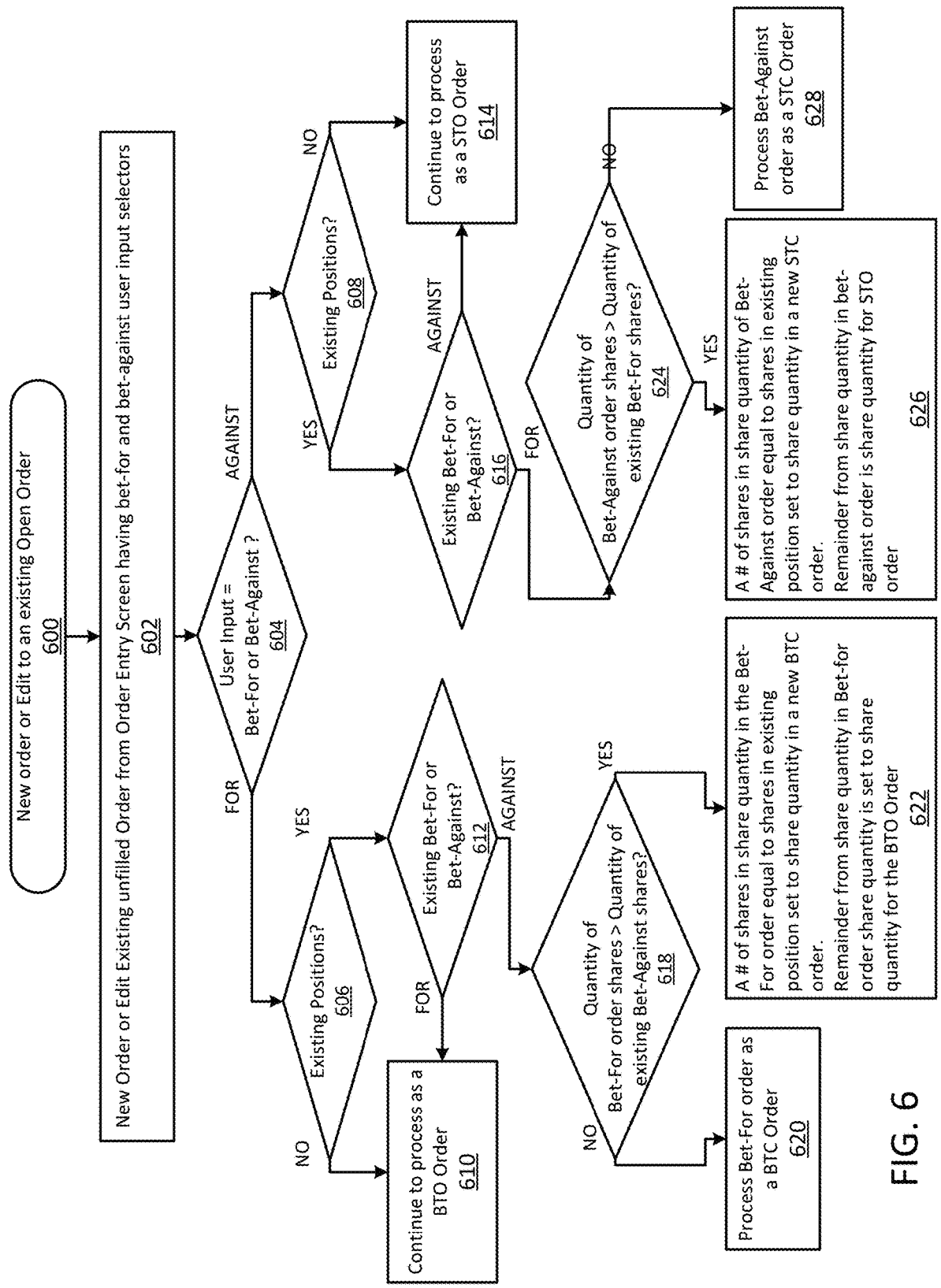
FIG. 6 is a flowchart illustrating processing of new orders when the trader enters orders as bet-for or bet-against orders.

FIG. 6 is a flowchart illustrating processing of new orders or edits to existing open orders. In some example implementations, the user interface may include selectors in which a trader can define a bet order and enter the bet order based on the desired action. For example, a user interface may include screens for entering limit amounts and share quantities and options to open or close, buy or sell positions. The example process illustrated in FIG. 6 may be implemented in example implementations of the bet exchange service platform 104 in which traders are provided only a bet-for or a bet-against selector on the user interface for entering bet orders. The selection of the bet-for selector communicates a BTO order to the system and the selection of the bet-against selector communicates a STO order.

When orders are entered in such an example implementation, the bet exchange core module 156 (in FIG. 1) determines whether or not the orders can be executed immediately. In example implementations, whether or not an order can be executed depends on whether there are other orders having a value that will result in a trade value amount that does not exceed the limit value of the newly entered order. If a newly entered order cannot be executed immediately, the order is left as an unfilled order. Unfilled orders can be edited after opened and while still unfilled.

A trader may make a new order via the user interface of the bet service app 106 (in FIG. 1) on the trader's client device 102. In an example implementation, an order entry screen is presented to the trader. In an example implementation, an order entry screen may be presented when a trader wants to take a new position, add to an existing position, or close an existing position. An example of an order entry screen is described below with reference to FIG. 11. As noted above, the user interface includes a bet-for selector and a bet-against selector.

The flowchart in FIG. 6 depicts operation of a method for processing a new order or an edit to an existing unfilled order 600. The system receives input for a new order or an edit to an existing unfilled order from a suitable order entry screen at step 602. The input may be received as a BTO order or a STO order. Decision block 604 determines if the order is for a bet-for position (BTO) or for a bet-against position (STO). If the order is a BTO order, decision block 606 determines if the trader has shares in an existing position in the standardized bet contract. If the trader has no shares in an existing position, the bet order is processed unchanged as a BTO order at step 610. If the trader has shares in an existing position, decision block 612 determines if the existing position is a bet-for or bet-against position. If the existing position is a bet-for position, the received BTO order is processed unchanged as a received BTO order at step 610, with the share quantity in the received BTO order adding to the shares in the existing bet-for position. If the existing position is a bet-against position, decision block 618 determines if the share quantity of the received BTO order is greater than the quantity of shares in the existing bet-against position. If the share quantity of the received BTO order is greater than the quantity of shares in the existing bet-against position, a number of the BTO order share quantity equal to the quantity of shares in the existing bet-against position is made the share quantity of a new BTC order at step 622. The remainder of the share quantity of the received BTO order is the new share quantity of the received BTO order. The BTC order effectively closes the existing shares in the bet-against position. The trader is left with a BTO order with the number of shares in the bet-for position that exceeded the shares in the bet-against position. For example, if a trader has 10 bet-against shares and makes an order for 20 bet-for shares in a BTO order, step 622 automatically creates a BTC order with a share quantity of 10 shares and the received BTO order has its share quantity reduced to 10 shares. At step 620, if the share quantity of new BTO order is not greater than the quantity of the existing bet-against positions, the full quantity of the new BTO order is processed as a BTC order leaving the trader with only a bet-against position with a reduced number of shares.

Referring to decision block 604, the new order is a bet-against (STO) order (Against path). Decision block 608 determines if the trader has an existing position. If the trader has no existing position, the STO order remains a STO order and is processed accordingly at step 614. If at decision block 608, the trader does have an existing position, decision block 616 determines if the existing position is a bet-for or bet-against position. If the existing position is a bet-against position, the new STO order continues processing unchanged as the received STO order at step 614. If the existing position is a bet-for position, decision block 624 determines if the share quantity indicated in the new received STO order is greater than the quantity of shares in the existing bet-for position. If the share quantity of the new STO order is greater than the quantity of shares in the existing bet-for positions, a number of the shares in the share quantity indicated in the new STO order equal to the quantity of shares in the existing bet-for position is made the share quantity in a new STC order at step 626. If the share quantity in the new STO order is not greater than the quantity of shares in the bet-for existing positions, the new STO order is processed unchanged as the new STO order at step 628. As an example, to illustrate operation of step 626, if a trader has 10 shares in a bet-for position and enters a STO order for 20 bet-against positions, a new STC order is generated with a share quantity of 10 and the share quantity of the received STO order is changed to 10.

Figure 7:
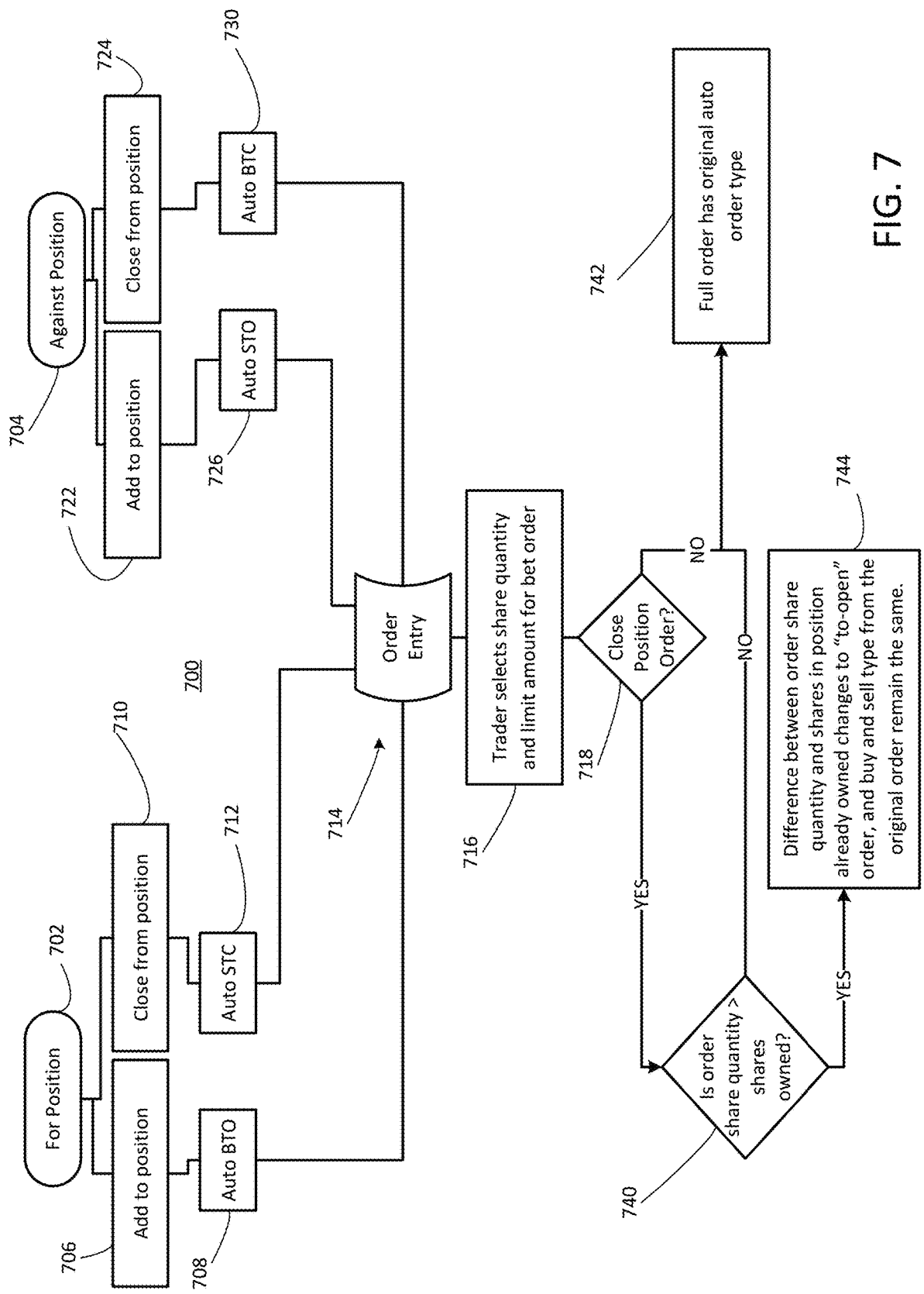
FIG. 7 is a flowchart illustrating processing of adding to and closing existing positions.

FIG. 7 is a flowchart illustrating processing of adding to and closing existing positions. Bet positions are a trader's interest in a standardized bet contract. The trader places BTO or STO orders and when unfilled orders meet, the bet orders forming the resulting instance of the standardized bet contract become bet positions. Bet positions may be held, added to, or closed giving the trader the opportunity to change his bet as the likelihood of the bet event occurring changes. The flowchart 700 in FIG. 7 illustrates how an order type is determined when a trader wishes to either add to a bet position or close a bet position in an example implementation. It is assumed that the user interface includes a bet-for and a bet-against selector, which open orders for positions (i.e. BTO orders and STO orders).

When a trader owns an existing bet-for position at step 702 in FIG. 7, the trader may either add to the position at step 706 or close the position at step 710. When the trader chooses to add to the bet-for position, the system automatically processes a BTO order at step 708. When the trader chooses to close the bet-for position, the system automatically processes a STC order at step 712.

When a trader owns an existing bet-against position at step 704 in FIG. 7, the trader may either add to the position at step 722 or close the position at step 724. When the trader requests to add to the bet-against position, the system automatically process a STO order at step 726. When the trader chooses to close the bet-against position, the system automatically processes a BTC order at step 730.

The trader adds to a position, or closes a position, in an example implementation by opening an order screen at step 714. At step 716, the order entry screen provides data entry fields in the user interface presented to the trader to enter a share quantity in a position and a limit amount. At decision block 718, the order is analyzed to determine if it is a close order. The trader may enter the order as a close order. Close orders may also be generated from different match combinations as shown above with reference to FIGS. 5A and 5B. If the order is not a close order, the entered order is processed with its original type at step 742. For example, a BTO order is processed as an order for a bet-for position. If the order is a close order at decision block 718, decision block 740 determines if the quantity entered in the order entry screen is greater than the number of shares owned in the position. If the quantity is not greater than the number of shares in the position owned, the order is processed as a close order at step 742. If the share quantity of the entered order is greater than the number of positions owned, the difference between the share quantity entered and the number of shares in the position owned is converted to a BTO or STO ("-to-open" order) at step 744. The buy and sell from the original order type remain unchanged.

Figure 8:
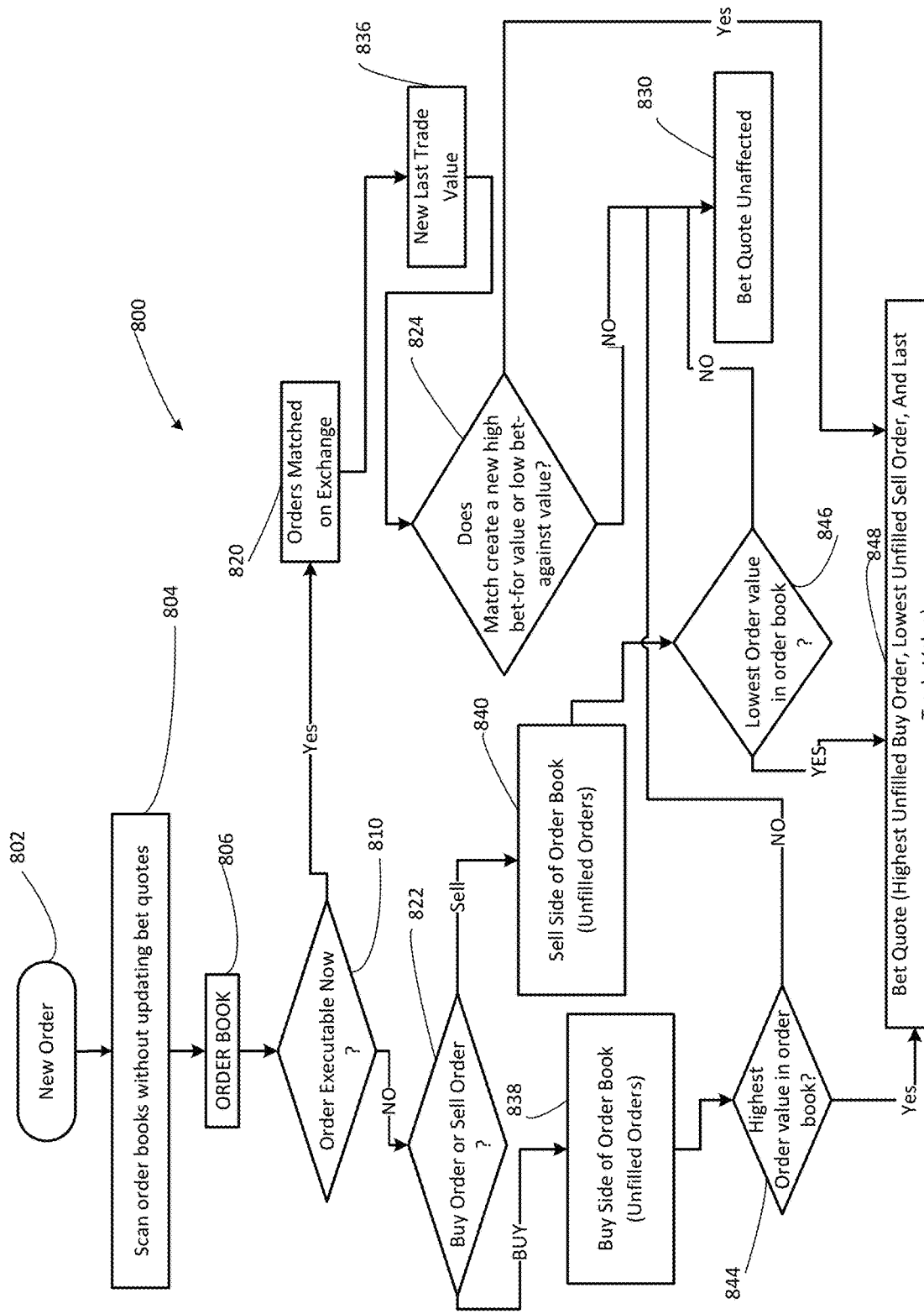
FIG. 8 is a flowchart illustrating processing of bet quotes and order books when new orders are entered.

FIG. 8 is a flowchart illustrating an example method 800 of processing of bet quotes and order books when new orders are entered. In an example implementation, new orders may affect or not affect a bet quote. Each instance of a standardized bet contract may include a bet quote maintained and updated as trades are made. The bet quote includes the highest unfilled buy order, the lowest unfilled sell order, and the most recent trade value per share. The last trade value is updated as the trade amount of the last contract executed. The high buy order value is updated when an order is entered at a value that is higher than the current highest buy trade value. The lowest unfilled bet-against order is updated when a sell order is entered at a value that is lower than the current lowest unfilled sell order.

In an example implementation, unfilled orders are stored in the order book 410 (FIG. 4) as described above with reference to FIG. 4. As shown in FIG. 8 at step 802, a new order is received or processed. The order may be a BTO order or a STO order in a system allowing only a bet-for or bet-against selection. At step 804, the order books 806 are scanned to determine if the new order is immediately executable as described above with reference to FIGS. 4-6.

Decision block 810 determines whether a match was found that would allow for an unfilled bet order in the order book to execute with the new bet order. If such a match is found, the bet order match is carried out on the bet exchange at step 820. At step 836, the last trade value per share of the standardized bet contract is updated to the trade value of the match carried out at step 820. At decision block 824, the match is checked to determine if a new high bet-for value or a low bet-against value is created. If NO, the bet quote is unaffected at step 830. If YES, step 848 updates the bet quote as described below.

If at decision block 810, the new bet order is not immediately executable, the order is analyzed to determine if the order is a bet-for order or a bet-against order at decision block 822. If it is a bet-against order (SELL path) the unfilled bet-against order is stored in the sell side of the order book at 840. The limit value is checked to determine if the bet-against order becomes the lowest unfilled order at decision block 846. If the limit amount of the bet-against order indicates that the bet-against order is the lowest unfilled bet-against order, the bet quote is updated at step 848. Otherwise (NO path from decision block 846), the bet quote is unaffected at step 830, If at decision block 822, the new order is a bet-for order (BUY path), the bet-for order is added to the buy side of the order book at 838. The limit amount of the new order is analyzed at decision block 844 to determine if the limit value would result in a new highest unfilled bet-for order. If the limit amount does not make it the highest value bet-for order in the order book, the bet quote is unaffected at step 830. If at decision block 844, the limit amount of the bet order makes it the highest valued unfilled bet-for order in the order book, the bet quote is updated at step 848.

Figure 9:
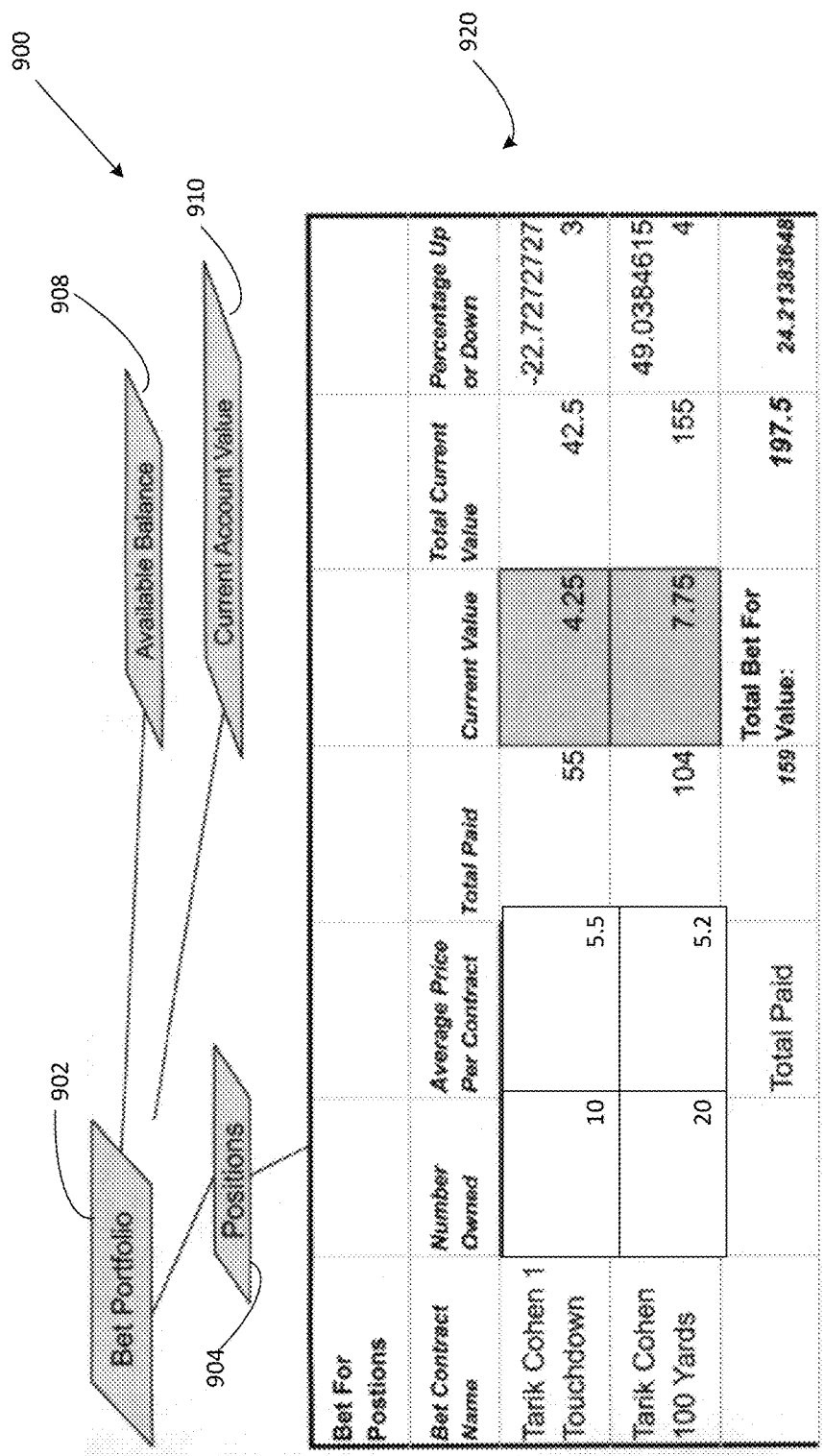
FIG. 9 is a schematic diagram illustrating a bet portfolio for a trader having positions in standardized bet contracts.

FIG. 9 is a schematic diagram illustrating a bet portfolio 900 for a trader having positions in standardized bet events. The trader's bet portfolio 900 may be displayed to the trader on the trader's client device. The bet portfolio 902 may include a list of bet positions 904 (expanded at 920), an available balance 908, and a current account 910.

In an example implementation, the trader's bet portfolio includes positions that may be stored by type. FIG. 9 depicts an example of a trader's bet-for positions 920. The bet portfolio may be stored with all relevant data and displayed in a variety of forms, which may be modified by the trader using a display filter. FIG. 9 illustrates relevant information that may be stored in the trader's bet-for positions 920 in the bet portfolio. Such information includes the name of the standardized bet contract, number of positions or shares owned, average price per contract, total paid, total current value, and percentage up or down over time. Other types of information may be added.

The dashboard 902 includes a trader's current positions list 920 shown in FIG. 9 in tabular form. The current positions list 920 stored in the system database may include a full set of data regarding the trader's holdings, much of which may not be displayed. For example, the current positions list in FIG. 9 includes a section for bet-for positions, which may be separate from another section for bet-against positions. The bet-for positions portion includes a bet contract name, a number of positions owned, an average cost per position, a total cost, a current value, a total current value, a percentage up or down, a total paid, a total bet value, and a total percentage up or down. The current positions list in the dashboard displayed to the trader may include all information available or only a portion of the information. An example of a dashboard that may be displayed to the trader is described below with reference to FIG. 13.

Figure 10:
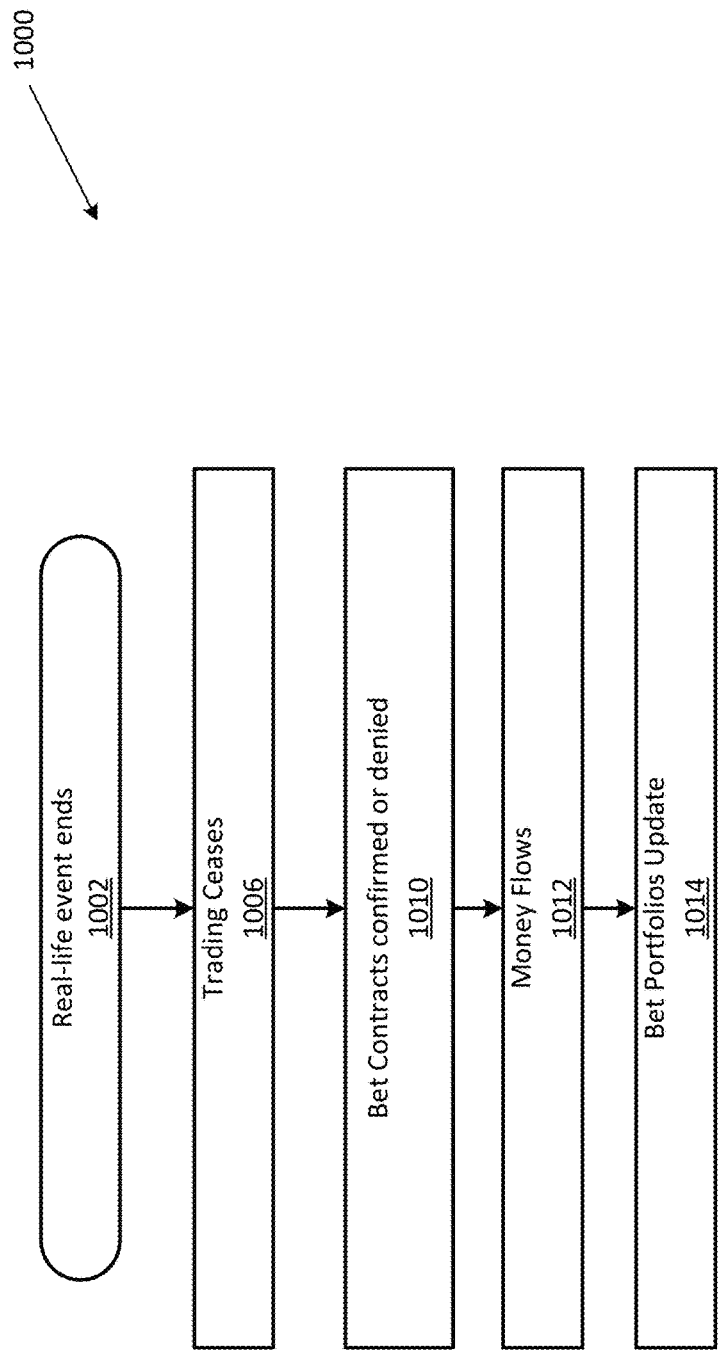
FIG. 10 is a flowchart illustrating an example process for settling a standardized bet contract.

FIG. 10 is a flowchart illustrating an example process for settling a standardized bet contract 1000. In an example implementation, standardized bet contract may be opened, modified, or otherwise remain playable even after the real-life event on which the bet event of the standardized bet contract is based has begun. In some standardized bet contracts, the betting may conclude before the real-life event ends, such as when the bet is on a player accomplishing a measure that is met with finality before the event ends. For example, in a standardized bet contract in which the bet event is on whether a player scores three touchdowns, the player may accomplish the bet event before the first half. If such a scenario occurs, trading on that standardized bet contract may be suspended, or merely stop due to a lack of player activity. When the real-life event is completed, no further betting or bet modifications can occur and the process of settlement begins.

Referring to FIG. 10, the real-life event ends at 1002. At step 1006, trading on the standardized bet contracts is stopped. Bet orders received on the standardized bet contracts are either rejected or ignored or disabled. Confirmation of the occurrence of a measure are confirmed or denied at step 1010. At step 1012, funds are paid out to the bet positions corresponding to whether or not the bet event occurred or not. Amounts based on standardized payout amounts and on share quantities are paid to the trader having bet-for positions if the bet event occurred. The payout amounts are paid to the traders having a bet-against position if the bet event did not occur. The bet portfolios of the traders may be finalized at step 1014.

Figure 11:
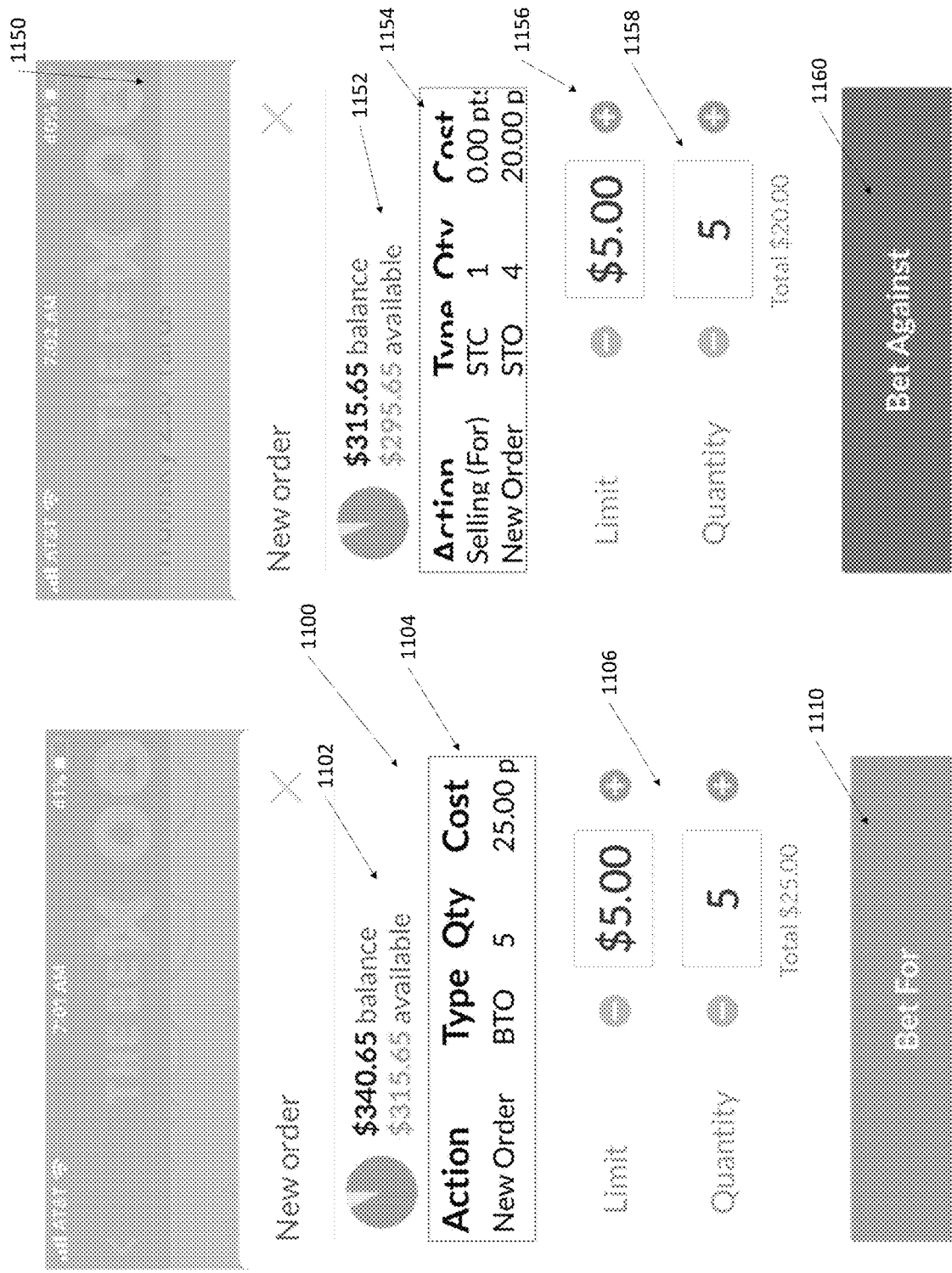
FIGS. 11-15 are examples of user interface screens that may be used on client devices to use the bet exchange system.

FIG. 11 depicts examples of order entry screens that may be displayed on a trader's client device for use in entering orders in the bet exchange system. The screens include a "Bet For" screen for entering BTO orders using a "Bet-for" selector. The bet-for screen 1100 includes a balance section 1102 indicating a current balance, which includes the amount available to the trader to place bet orders and enter standardized bet contracts. The balance section 1102 also shows an available balance, which includes entry fees paid and bet positions held by the trader but may not include amounts paid for unfilled orders.

The bet for screen 1100 includes an action summary section 1104, which includes an action, or a description of the action being attempted by the trader, a type of action (BTO, BTC orders), a share quantity, and a total cost. The bet for screen 1100 also includes a limit field 1106 for entering a limit amount representing the maximum amount the trader is willing to pay to make the bet-for order. A quantity field 1108 provides a data entry field for entry of a number of shares desired in the bet-for position. The quantity number is multiplied by the limit amount to determine the total amount the trader is willing to pay.

Once the trader enters the desired information to open an order, the trader presses a bet-for button, or selector 1110 to enter the order into the system.

FIG. 11 depicts the bet-against screen 1150, which includes similar information as the bet-for screen 1100, such as a balance section 1152, an action summary section 1154, a limit field 1156, and a quantity field 1158. The trader may enter a bet-against order once the information desired is entered into the screen by pressing a bet-against button 1160.

It is noted that an order entry screen in example implementations may include more or less information. The information is provided to assist the trader in deciding how much or whether to open an order. An order entry screen may also be provided to close orders. For example, the buttons would provide BTO, BTC, STO, and STC options.

Figure 12:
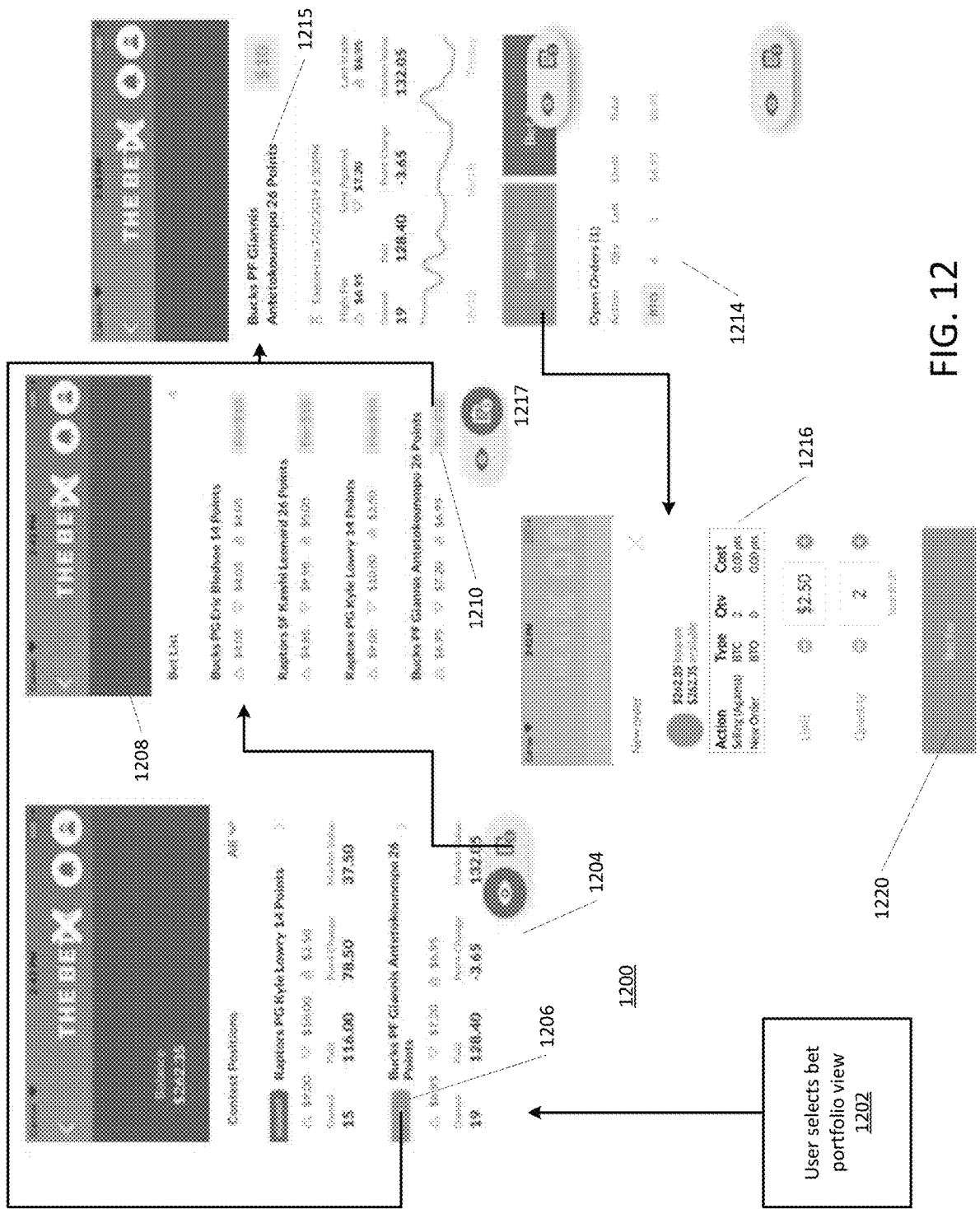

FIG. 12 is a user interface flow diagram illustrating an example of the flow of the use of the bet exchange to view a trader's bet portfolio, view available standardized bet contracts, and enter a bet order to open or close a position. The flow begins at step 1202 when the trader selects to view the bet portfolio. The user interface display on the client device may display a trader bet portfolio screen 1204 or a standardized bet contract list 1208. The trader may press a switch view selector to display a bet list 1208. The trader may press a switch selector on the bet list screen 1208 to go back to the bet portfolio screen 1204. The trader may select a standardized bet contract in either the current positions list 1204 or the bet list 1208 to display a bet page 1214. The bet page 1214 includes the bet event identifier 1215, the bet quote 1217, a bet-for selector and a bet-against selector, and a section listing any unfilled orders that the trader may hold on the standardized bet contract. The bet page 1214 may provide information relating to a trader's risk in placing a bet order. When the trader decides to act, the trader may select either the bet-for selector or the bet-against selector. The example shown in FIG. 12 depicts a selection of the bet-for selector. The client device displays an order entry screen 1216 for a bet-for order, which is similar to the example order entry screen 1100 in FIG. 11.

Figure 13:
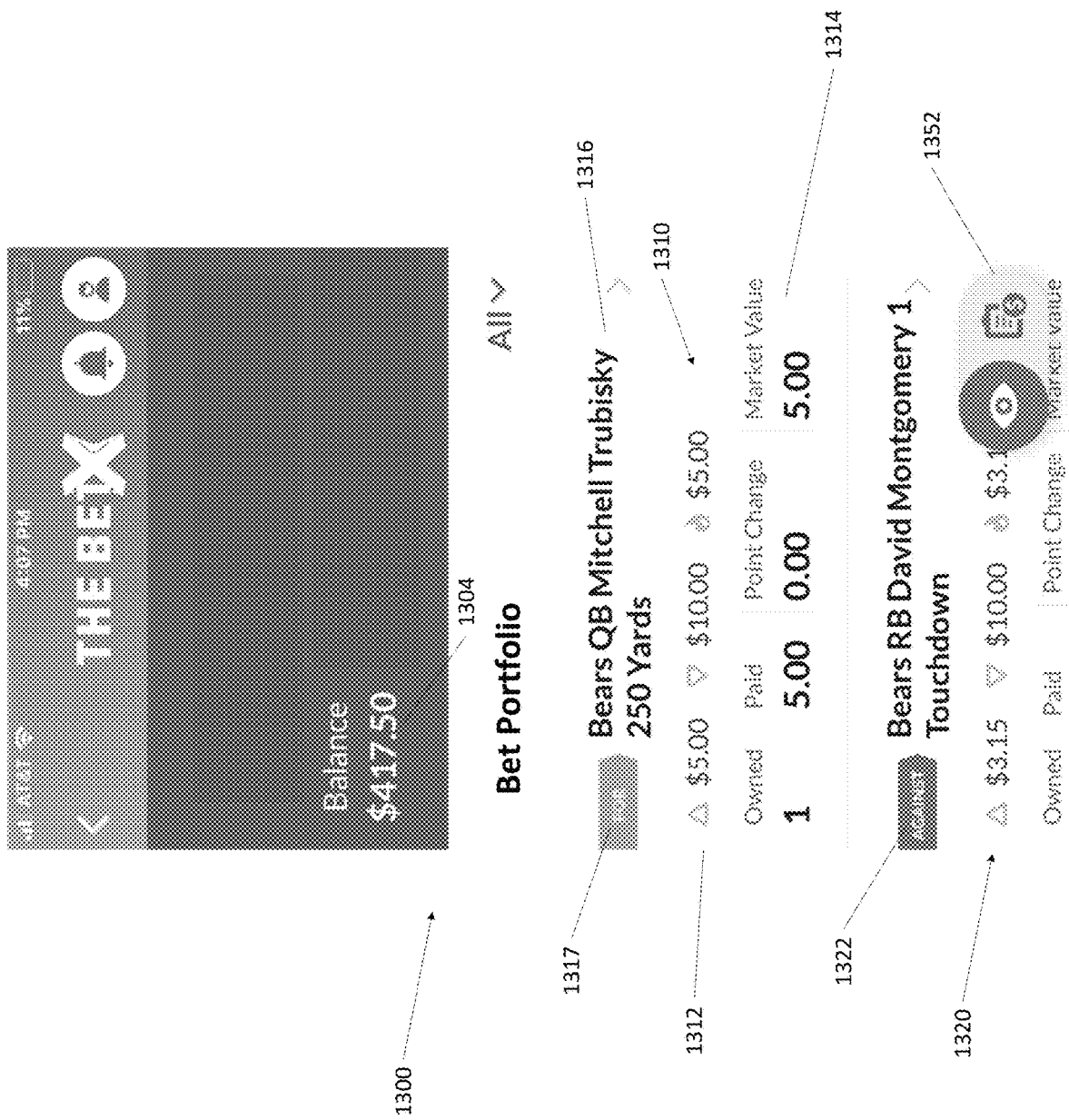

A more detailed example of a trader bet portfolio screen is shown in FIG. 13. The bet portfolio screen 1300 in FIG. 13 may include the trader's balance 1304, a list of positions list forming the bet portfolio having a first current position 1310 and a second current position 1320 displayed as examples. The first current position 1310 includes a description of the standardized bet contract 1316, which includes a type indicator 1317. In this current position 1310, the type indicator 1317 indicates that the trader has a bet-for position on the first current position 1310. The current position 1310 also includes a bet quote 1312 for the standardized bet contract. The first current position includes an interest summary 1314 indicating the extent of the trader's interest in the standardized bet event. For example, the interest summary 1314 in FIG. 13 indicates that the trader owns one position for which the trader paid $5 or 5 points per position. The standardized bet contract is constantly traded by other traders and its trade value will change. The interest summary 1314 may be with the points change shown in the interest summary 1314. The market value is also shown and is calculated as the number of positions (1) multiplied by the last trade value in the bet quote 1312 ($5) for a total market value of $5. Other information relevant to the trader's position may be added in the interest summary 1314. Traders may use the information in the interest summary 1314 to monitor how the trader's bet positions are performing. The interest summary 1314 combined with the bet quote 1314 and other types of information that may be derived from the bet quote and interest summary 1314 are powerful tools that may be provided to the trader to assist the trader in deciding how to maximize winnings and reduce risk. The trader may monitor fluctuations in the value of the trader's positions quickly, almost in real-time, and implement responses to the changes quickly.

The second current position 1320 is a bet-against position as indicated by a type indicator 1322. The second current position 1320 includes the information contained in the first current position 1310, such as a bet quote 1322, and an interest summary.

The bet portfolio screen 1300 in FIG. 13 may include a pair of display change buttons, such as a current position display button 1350 and a bet list display button 1352. The trader may press the bet list display button 1352 to display a bet list of standardized bet events available to play. An example bet list is described below with reference to FIG. 14. When the bet list is displayed, the same buttons are available. The trader may press the current positions display button 1350 to display the bet portfolio as shown in FIG. 13.

Figure 14:
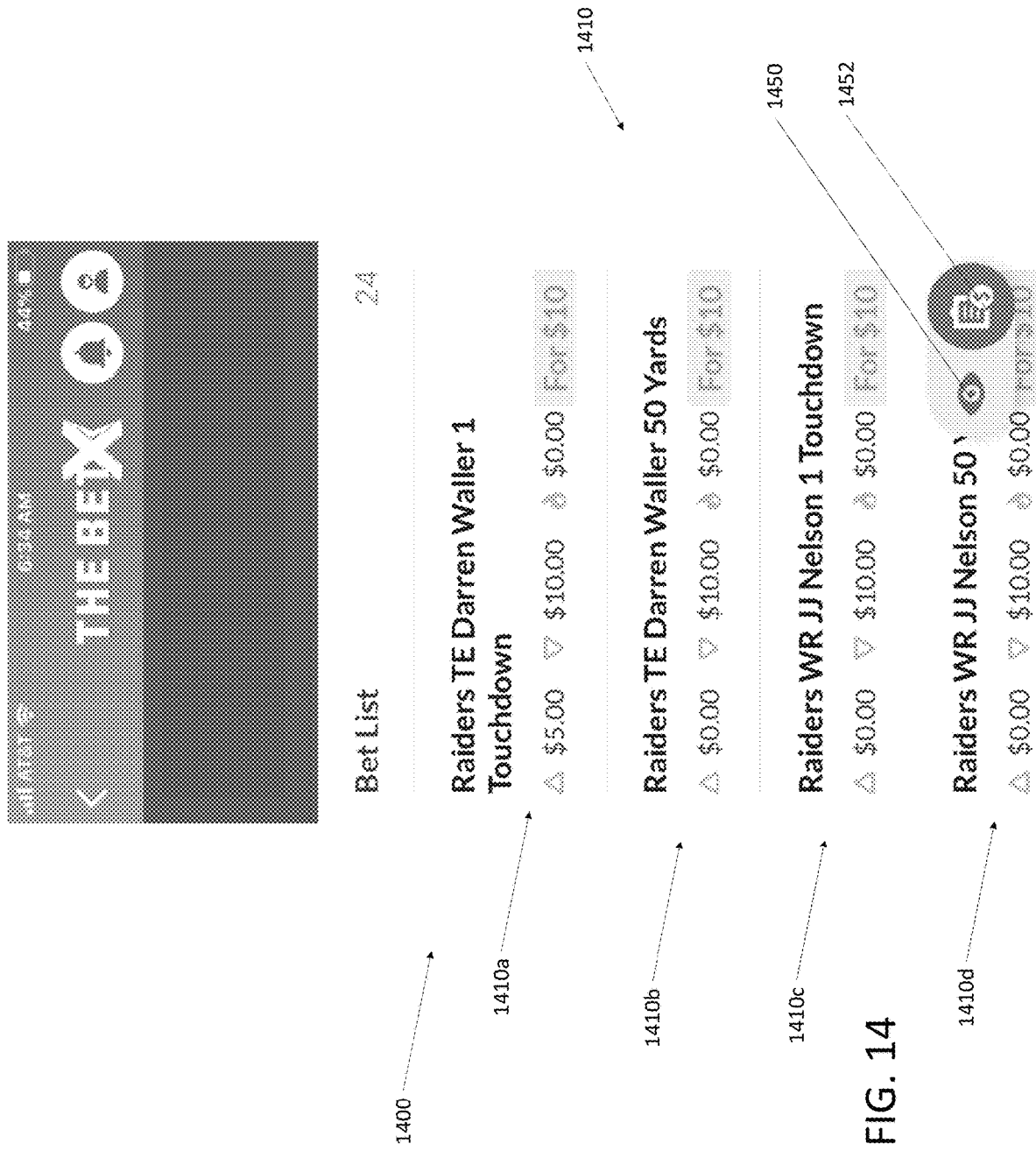

FIG. 14 is a more detailed view of a bet list 1400, which is an example of the bet list 1204 shown in FIG. 12. The bet list 1400 in FIG. 14 includes a standardized bet contract list 1410 comprising standardized bet contracts available to the trader for making bet orders. The standardized bet contract list 1410 includes four standardized bet contracts 1410a, 1410b, 1410c, and 1410d. Each standardized bet contract includes a description of the bet event (e.g. subject, event/statistical milestone), a current bet quote, and a standardized payout amount. The bet list 1400 also includes the display switch buttons 1450 and 1452.

Figure 15:
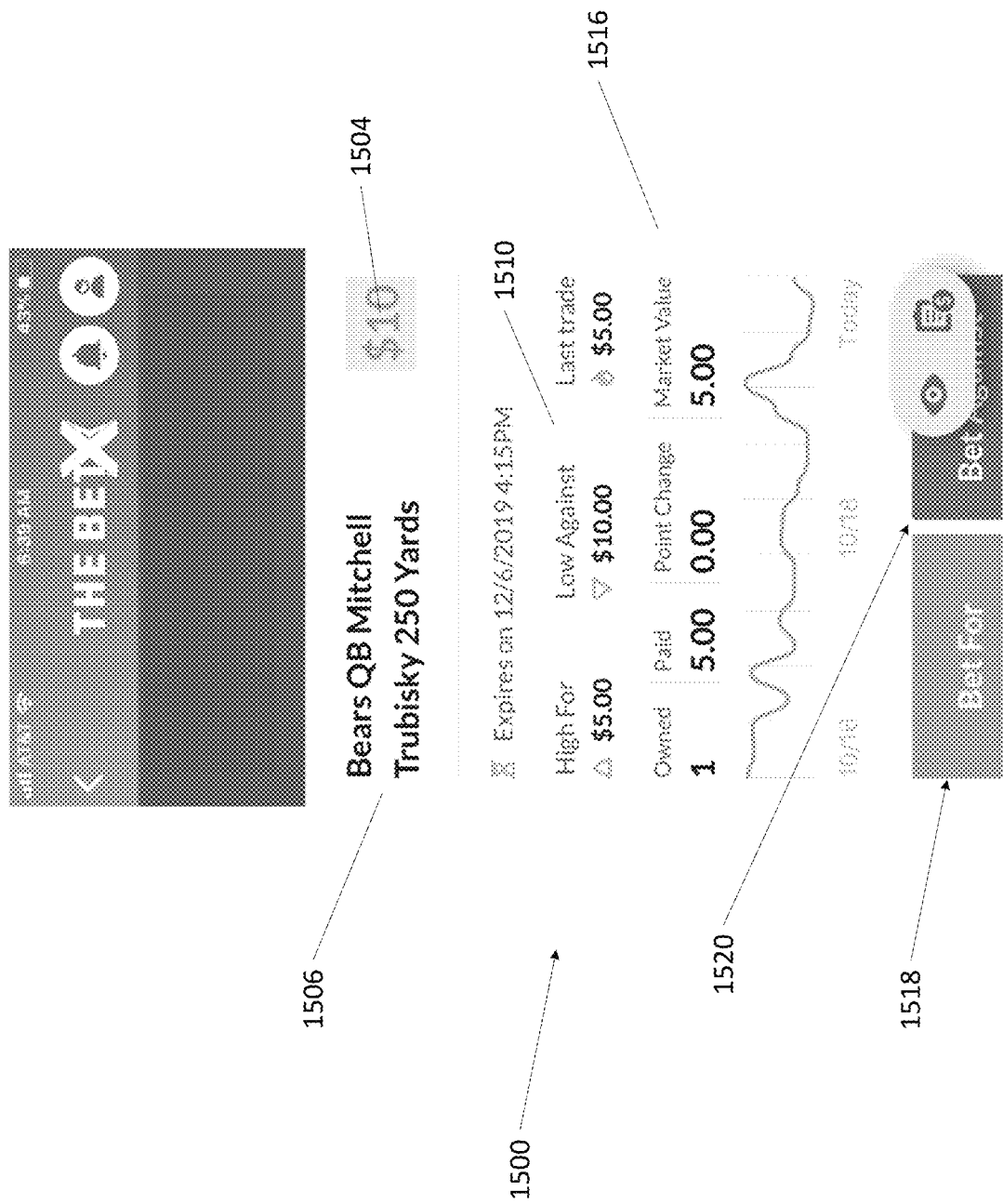

FIG. 15 is a bet page 1500, which is a more detailed example of the bet page 1206 in FIG. 12. The example bet page 1500 in FIG. 15 includes a standardized payout amount 1504, a bet event description 1506, a bet quote 1510, a research summary section 1516, a bet for button 1518 to select to enter a BTO position, a bet against button 1520 to select to enter a STO order. The bet page 1500 may also include an open orders section to list unfilled orders that the trader may have pending for the standardized bet contract.

The disclosure provided herein describes features in terms of preferred and exemplary embodiments thereof. Numerous other embodiments, modifications and variations within the scope and spirit of the appended claims will occur to persons of ordinary skill in the art from a review of this disclosure.

What is claimed is:

1. A bet exchange system comprising:
   a data network connection to communicate over a data network with a plurality of client devices;
   a data network connection to communicate over a data network with a plurality of client devices associated with a plurality of users, the client devices having a display, a graphical user interface (GUI), and a bet exchange client application configured to generate a bet order from data entered by the user using an order entry screen, where the bet order includes digital data corresponding to a buy order or a sell order for a bet-for position on a bet event occurring or a bet-against position on the bet event not occurring, each bet order having a limit amount entered by the user, to transmit the bet order via the data network to a server configured to receive a plurality of bet orders from the plurality of client devices; and display at least one bet position indicative of a corresponding at least one standardized bet contract generated by the server from previously transmitted bet orders, where each bet position displayed includes at least the last trade value for the bet position, and a selector for opening an order entry screen for the bet position to receive data from the user to modify the user's bet position;

a system database configured to store bet records and executable programs configured to receive and send communications over the data network, and to perform program functions of the bet exchange system;

a plurality of bet orders received electronically over the data network;

a bet exchange core module comprising program functions executed by a processor operating in the server, the bet exchange core module configured to match buy orders with sell orders, the buy orders including buy-to-open (BTO) orders and the sell orders including sell-to-open (STO) orders, and to generate instances of two-party standardized bet contracts each having a bet-for position and a bet-against position on the bet event, each standardized bet contract comprising a bet event identifier and a standardized payout amount, where the bet exchange core module compares the limit amount of the bet orders to determine a trade amount for a match that does not exceed the limit amounts of the bet orders; and a fulfillment module configured to manage a transfer of an amount based on a final trade value of the instances of standardized bet contract and the standardized payout amount to traders holding bet-for positions when the bet event has occurred or to the traders holding bet-against positions when the bet event has not occurred.

2. The bet exchange system of claim 1 further comprising:
a sequencing module configured to receive unfilled bet orders and to store the unfilled bet-for orders in a buy-side of an order book in a buy sequence starting from a highest valued unfilled bet-for order to a lowest valued unfilled bet-for order, the sequencing module further configured to store unfilled bet-against orders in a sell-side of the order book in a sell sequence starting from a lowest valued unfilled bet-against order to a highest valued bet-against order.

3. The bet exchange system of claim 2 where the bet exchange core module matches BTO orders and STO orders by:
comparing the limit amount of the BTO orders with the limit amount of the STO orders;
setting the trade amount of a match between each BTO order and STO order to the limit value of the bet order received earlier in time.

4. The bet exchange system of claim 3 where in comparing the limit amounts of the bet orders, one of either the BTO order or the STO order is a received bet order and the other one of the BTO order or the STO order is retrieved from the order book, the bet exchange core module matches BTO orders and STO orders by:
setting the trade amount of the match between the BTO order and STO order to the limit value of the bet order retrieved from the order book.

5. The bet exchange system of claim 4 where in comparing the limit amounts of the bet orders:
determining, during the comparing of the received bet order and the bet order in the order book whether a match based on the limit amount of the bet order from the order book is immediately executable; and
moving the received bet order to the order book if the match is not immediately executable.

6. The bet exchange system of claim 4 where:
a plurality of the bet orders received from the client devices includes buy-to-close (BTC) orders and sell-to-close (STC) orders, and the bet exchange core module, in addition to comparing BTO and STO bet orders, compares bet orders in combinations consisting of: BTO orders with STC orders, BTC orders with STO orders, and BTC orders with STC orders, the bet exchange system further comprising:
a position modifier module configured to:
match bet orders to transfer an existing bet-for position when a BTO order meets an STC order at a trade amount that is equal to or less than the limit amounts of the BTO order and the STC order,
match bet orders to transfer an existing bet-against position when a BTC order meets an STO order at a trade amount that is equal to or less than the limit amounts of the BTC order and the STO order,
match bet orders to close an existing bet-against position and an existing bet-for position to close two instances of the standardized bet contract and generate a new instance of the standardized bet contract when a BTC order meets an STC order at a trade amount that is equal to or less than the limit amounts of the BTC order and the STC order.

7. The bet exchange system of claim 6 where each bet order includes a shares quantity indicative of, for bet-for orders, a number of bet-for shares in the bet-for position for which the bet-for order is place or, for bet-against orders, a number of bet-against shares requested in the bet-against position for which the bet-against order is placed.

8. The bet exchange system of claim 7 further comprising a current positions list corresponding to each trader where, when generating the instance of the standardized bet contract, the bet position generated in the standardized bet contract is transferred to the current positions list of the trader that sent the bet order, where each bet position comprises a quantity of shares, an average amount paid for each share, and an order type identifier.

9. The bet exchange system of claim 8 where, each bet order received is sent by an order maker as either a bet-for order or a bet-against order, and the bet exchange core module:
determines, when the received bet order is a received bet-for order, whether the current position list for the order maker of the received bet-for order includes existing positions in the bet event;
processes the received bet-for order as a received BTO order when the current position list of the bet-for order maker does not include any existing positions in the standardized bet event;
determines whether the existing positions of the bet-for order maker in the bet event are bet-for positions or bet-against positions;
processes the received bet-for order as a BTO order when the existing positions of the trader in the standardized bet event are bet-for positions;
determines when the existing positions of the bet-for order maker are bet-against positions, whether the share quantity of the received bet-for order is greater than the quantity of existing bet-against positions;

processes the received bet-for order as a received STC order with a share quantity equal to the share quantity of the existing bet-against positions and moving the received bet-for order to the order book as a BTO order with a share quantity equal to a remainder of the share quantity of the received bet-for order when the share quantity of the received bet-for order is greater than the share quantity of existing bet-against positions; and processes the received bet-for order as a received STC order for a share quantity equal to the share quantity of the received bet-for order and leaving the existing bet-against positions as bet-against positions with a share quantity equal to a remainder of the share quantity of existing bet-against positions when the share quantity of the received bet-for order is less than or equal to the share quantity of existing bet-against positions.

10. The bet exchange system of claim 9 in receiving each bet order, the bet exchange core module:

determines, when the received bet order is a received bet-against order, whether the current position list for the bet-against order maker includes existing positions in the bet event;

processes the received bet-against order as a received STO order when the current position list of the bet-against order maker does not include any existing positions in the bet event;

determine whether the existing positions of the bet-against order maker in the bet event are bet-for positions or bet-against positions;

processes the received bet-against order as a received STO order when the existing positions of the bet-against order maker in the bet event are bet-against positions;

determine when the existing positions of the bet-against order maker are bet-for positions, whether the share quantity of the received bet-against order is greater than the share quantity of the existing bet-for positions;

processes the received bet-against order as a BTC order with a share-quantity equal to the share quantity of the existing bet-for positions and moving the received bet-against order as a STO order to the order book with a share quantity equal to a remainder of the share quantity of the received bet-against order when the share quantity of the received bet-against order is greater than the share quantity of existing buy-for positions; and processes the received bet-against order as a BTC order with a share quantity equal to the share quantity of the received bet-against order and leaving the existing bet-for positions as bet-for positions with a share quantity equal to a remainder of the quantity of existing bet-for positions when the share quantity of the received bet-against order is less than the share quantity of existing bet-for positions.

11. The bet exchange system of claim 10 where in receiving the plurality of bet orders, the system further comprises:

an order sequencer configured to sequence the unfilled BTO orders and BTC orders that are not immediately executable in the order book from a highest limit amount to a lowest limit amount, and to sequence the unfilled STO orders and STC orders that are not immediately executable in the order book from a lowest limit amount to a highest limit amount.

12. The bet exchange system of claim 11 where in matching the one of the BTO orders with STO orders, the bet exchange core module further:

sets the last trade value per share of the bet event to the trade amount per share for the match between the BTO order and the STO order;

generates the instance of the standardized bet contract between the BTO order and the STO order for the bet event;

deduct the value of the trade based on the trade amount per share of the bet event for the share quantity of the trade from the available balance of the trader that made the BTO order; and deduct the value of the trade based on the standardized payout amount minus the trade amount per share for the share quantity of the trade from the available balance of the trader that made the STO order.

13. The bet exchange system of claim 11 where in matching one of the BTO orders with one of the STC orders, the bet exchange core module:

sets the last trade value of the bet event per share of the bet event to the trade amount per share for the match between the BTO order and the STC order;

deducts the last trade value per share of the bet event for the share quantity of the match from the available balance of the trader that made the BTO order; and add the last trade value per share of the bet event for the share quantity of the match to the available balance of the trader that made the STC order.

14. The bet exchange system of claim 11 where in matching one of the BTC orders with one of the STO orders, the bet exchange core module:

sets the last trade value per share of the bet event to the trade amount per share for the match between the BTC order and the STO order;

adds the standardized payout amount per share minus the last trade value per share of the bet event for the quantity of shares matched from the available balance of the trader that made the BTC order; and deducts the standardized payout amount per share minus the last trade value per share for the share quantity of the match from the available balance of the trader that made the STO order.

15. The bet exchange system of claim 11 where in matching one of the BTC orders with one of the STC orders, the bet exchange core module:

sets the last trade value per share of the bet event to the trade amount per share for the match between the BTC order and the STC order;

adds the standard payout amount per share minus the last trade value per share for the share quantity of the match from the available balance of the trader that made the STC order; and adds the last trade value per share for the quantity of shares in the match to the available balance of the trader that made the STC order.

16. The bet exchange system of claim 11 where the bet exchange core module:

stores unfilled bet-for orders that could not be immediately executed in the order book on a for-side separate from an against-side; and stores unfilled bet-against orders in the order book in the against-side.

17. A non-transitory, computer-implemented method on a bet exchange system operating on a server and having a system database, the method comprising:

receiving a plurality of bet orders over a data network from a plurality of client devices associated with a plurality of traders, where the client devices each include a bet exchange client application, where the bet orders comprise digital data representing buy orders and sell orders for bet-for positions on a bet event in a real-life event occurring and bet-against positions to bet on the bet event not occurring, each bet order having a limit amount and an order type including a buy-to-open ("BTO") order to open bet-for positions and a sell-to-open ("STO") order to open bet-against positions, where the bet exchange client application operating on the client devices receives digital data from the user via a graphical user interface to generate the bet orders;

comparing, by a processor on the server, the limit amount of the BTO orders with the limit amount of the STO orders to determine a trade amount for a match between BTO and STO orders;

generating, by the processor on the server, an instance of a two-party standardized bet contract when the trade amount of a match between one of the BTO orders and one of the STO orders is less than or equal to a value based on the limit amounts of the BTO order and the STO order, where the BTO order and the STO order in the standardized bet contracts become a bet-for position and a bet-against position, respectively, for the traders that sent the bet orders, where each standardized bet contract comprises a bet event identifier and a standardized payout amount, and each instance of a standardized bet contract further includes the bet-for position and the bet-against position on the bet event; and settling, by the processor on the server, the instances of standardized bet contracts by transferring an amount based on a final trade value of the instances of standardized bet contract and the standardized payout amount to the traders holding bet-for positions when the bet event has occurred or to the traders holding bet-against positions when the bet event has not occurred.

18. The method of claim 17 where:

the step of receiving the plurality of the bet orders received from the client devices includes receiving buy-to-close (BTC) orders and sell-to-close (STC) orders, the method further comprising:

comparing, in addition to comparing BTO and STO bet orders, bet orders in combinations comprising BTO with STC orders, BTC with STO orders, and BTC with STC orders, the method further comprising:

matching bet orders to transfer an existing bet-against position to a new bet-for position when a BTO order meets an STC order at a trade amount that is equal to or less than the limit amounts of the BTO order and the STC order, matching bet orders to transfer an existing bet-for position to a new bet-against position when a BTC order meets an STO order at a trade amount that is equal to or less than the limit amounts of the BTC order and the STO order, matching bet orders to close an existing bet-against position and an existing bet-for position to close two instances of the standardized bet contracts and generating a new instance of the standardized bet contract when a BTC order meets an STC order at a trade amount that is equal to or less than the limit amounts of the BTC order and the STC order.

19. The method of claim 17 where the step of comparing the limit amount of the BTO orders with the limit amount of the STO orders comprises:

where one of the bet orders is a received bet order and is either a received BTO order or a received STO order, and the other one of the bet orders is an unfilled bet order that is either an unfilled BTO order or an unfilled STO order, setting the trade amount of a match between one of the received bet orders and one of the unfilled bet orders to the limit amount of the unfilled bet order.

20. The method of claim 17 further comprising:

creating a user account in the system database for each trader associated with the plurality of client devices, each user account comprising a bet portfolio comprising a trader current positions list, and an available balance for the trader.

* * * * *